United States Patent
Harris, III et al.

(10) Patent No.: US 7,085,100 B2
(45) Date of Patent: Aug. 1, 2006

(54) MAGNETIC HEAD HAVING A BILAYER POLE TIP

(75) Inventors: Tom King Harris, III, Morgan Hill, CA (US); Wen-chien David Hsiao, San Jose, CA (US); Gautam Mohan Khera, Morgan Hill, CA (US); David Kaimon Lee, San Jose, CA (US); Edward Hin Pong Lee, San Jose, CA (US); Hugo Alberto Emilio Santini, San Jose, CA (US); Samuel Wei-san Yuan, Sartoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 494 days.

(21) Appl. No.: 10/101,394

(22) Filed: Mar. 19, 2002

(65) Prior Publication Data

US 2003/0179497 A1 Sep. 25, 2003

(51) Int. Cl.
   *G11B 5/147* (2006.01)
(52) U.S. Cl. .................................... 360/126
(58) Field of Classification Search ............... 360/126, 360/317, 125, 123, 318; 29/603.14; 428/332, 428/328
See application file for complete search history.

(56) References Cited

U.S. PATENT DOCUMENTS

| | | | |
|---|---|---|---|
| 5,559,654 A * | 9/1996 | Das | 360/126 |
| 5,774,308 A * | 6/1998 | Ohtsuka et al. | 360/126 |
| 5,864,450 A | 1/1999 | Chen et al. | |
| 5,996,213 A | 12/1999 | Shen | |
| 6,043,959 A | 3/2000 | Crue | |
| 6,163,442 A | 12/2000 | Gill et al. | |
| 6,195,229 B1 | 2/2001 | Shen | |
| 6,198,597 B1 * | 3/2001 | Tateyama et al. | 360/126 |
| 6,224,719 B1 | 5/2001 | Westwood | |
| 6,233,116 B1 | 5/2001 | Chen | |
| 6,278,590 B1 | 8/2001 | Gill | |

(Continued)

FOREIGN PATENT DOCUMENTS

JP    2001184612    6/1999

(Continued)

OTHER PUBLICATIONS

H. Jouve & R. Simmons, Thin Film Horizontal head with Enhanced Write Characteristics for Magnetic Recording, IBM Technical Disclosure Bulletin, Dec. 1995, p. 53, vol. 38.

H. Jouve & R. Simmons, Thin Film Horizontal head with Enhanced Write Characteristics for Magnetic Recording, IBM Technical Disclosure Bulletin, Aug. 1995, p. 121, vol. 38.

(Continued)

*Primary Examiner*—Tianjie Chen
(74) *Attorney, Agent, or Firm*—John J. Oskorep, Esq.; Rambod Nader

(57) ABSTRACT

A magnetic head having improved overwrite capabilities and reduced fringing fields are described along with methods of making the same. The magnetic head has a first pole piece and a second pole piece. The first pole piece includes a first bottom pole piece layer, a pedestal portion formed over the first bottom pole piece layer, and a notched top pole portion formed over the pedestal portion. A gap layer separates the second pole piece from the notched top pole portion. The pedestal portion has a first saturation magnetization $M_{S1}$ and the top pole portion has a second saturation magnetization $M_{S2}$ that is greater than the first saturation magnetization $M_{S1}$. The top pole portion has a substantially planar top surface over which a portion of the gap layer and the second pole piece are formed.

16 Claims, 14 Drawing Sheets

U.S. PATENT DOCUMENTS

| | | | |
|---|---|---|---|
| 6,338,899 B1 * | 1/2002 | Fukuzawa et al. | 428/332 |
| 6,339,523 B1 | 1/2002 | Santini | |
| 6,466,416 B1 * | 10/2002 | Honjo et al. | 360/317 |
| 6,668,442 B1 * | 12/2003 | Sasaki | 29/603.14 |
| 6,822,830 B1 * | 11/2004 | Mino et al. | 360/126 |
| 6,870,712 B1 * | 3/2005 | Chen et al. | 360/317 |
| 6,873,494 B1 * | 3/2005 | Chen et al. | 360/126 |
| 6,885,519 B1 * | 4/2005 | Sasaki | 360/126 |
| 2002/0131202 A1 | 9/2002 | Westwood | |
| 2004/0265570 A1 * | 12/2004 | Takahashi et al. | 428/328 |

FOREIGN PATENT DOCUMENTS

WO      WO 99/28904      10/1999

OTHER PUBLICATIONS

H. Jouve & R. Simmons, Thin Film Horizontal head with Enhanced Write Characteristics for Magnetic Recording, IBM Technical Disclosure Bulletin, Jul. 1995, p. 541, vol. 38.

* cited by examiner

MAGNETIC HEAD HAVING A BILAYER POLE TIP

BACKGROUND OF THE INVENTION

1. Field of the Invention

This invention relates generally to magnetic heads in disk drives, and more particularly to magnetic write heads with bilayer pole tips and methods of making the same.

2. Description of the Related Art

A write head is typically combined with a magnetoresistive (MR) or giant magnetoresistive (GMR) read head to form a merged head, certain elements of which are exposed at an air bearing surface (ABS). The write head comprises first and second pole pieces connected at a back gap that is recessed from the ABS. The first and second pole pieces terminate at the ABS where they define first and second pole tips, respectively. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces magnetic write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR or GMR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

A GMR read head includes a GMR sensor which manifests the GMR effect. In the GMR sensor, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g., nickel-iron, cobalt, or nickel-iron-cobalt) separated by a layer of nonmagnetic material (e.g., copper) are generally referred to as spin valve (SV) sensors manifesting the SV effect. Recorded data can be read from a magnetic medium because the external magnetic field from the recorded magnetic medium (the signal field) causes a change in direction of magnetization in the free layer, which in turn causes a change in resistance of the SV sensor and a corresponding change in the sensed current or voltage. A GMR head is typically associated with a design in which the second shield layer and first pole piece are not a common layer. These pieces are separated by a non-magnetic material, such as alumina, or a metal that can be deposited using a physical vapor deposition technique or an electro-plating technique, for example.

One or more heads may be employed in a magnetic disk drive for reading and writing information on circular tracks of a rotating disk. A merged head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically less than 0.02 μm in today's disk drives.

Consumer demand for disk drives with larger storage capacity and higher data areal density requires, in part, improvement of the performance of the write head. There are several conventional techniques used for making an improved write head. For example, one technique involves electroplating a pedestal over the first pole piece as part of the first pole tip and then notching the pedestal. The use of the notched pedestal is advantageous since it generally reduces the head's fringing field, which is the field that extends over the adjacent track when the current track is being written to. The reason that the notched pedestal reduces the fringing field is because the field is captured by the notched pedestal instead of being spread out laterally over the flat portion of the first pole piece on each side of the second pole tip.

Another conventional technique involves notching the pole tip of the first pole piece. Here, the second pole and its pole tip are first frame-plated on top of the gap layer. After depositing a seed layer on the gap layer, a photoresist layer is spun on the seed layer, imaged with light, and developed to provide an opening surrounded by a resist wall for plating the second pole piece and second pole tip. Once the second pole tip is formed, the first pole piece is notched opposite the first and second bottom corners of the second pole tip. A prior art process for notching the first pole piece entails ion beam milling the gap layer and the first pole piece, employing the second pole tip as a mask. According to this prior art process (typified in U.S. Pat. No. 5,452,164 and U.S. Pat. No. 5,438,747), the gap layer is typically alumina and the first and second pole pieces and pole tips are typically Permalloy (NiFe). Notching improves the transfer of flux between the second pole tip and the first pole piece, as the flux will transfer to the pedestal portion of the first pole piece instead of its larger expanse.

Write heads must continuously be improved to provide for better overwrite (OW) capabilities and reduced fringing fields. One prior art technique described in U.S. Pat. No. 5,864,450A1 teaches the utilization of an additional material on top of the pole tip which has a higher saturation magnetization than that of the material beneath it. This improves the write performance of the write head. However, this technique is limited in application to a write head that does not have a pedestal on its pole piece and no fixed throat height. Both materials have a relatively low magnetic moment by today's standards.

What is needed is an improved write head which provides for superior writing capabilities, including better overwrite capabilities and reduced fringing fields. Better methods for making such magnetic heads are also needed.

SUMMARY OF THE INVENTION

As described herein, a first aspect of the present invention involves magnetic write heads having unique bi-layer pole tips for improved overwrite (OW) capabilities and reduced fringing fields. A second aspect of the present invention involves methods of making such magnetic heads.

In accordance with the first inventive aspect, a magnetic head has a first pole piece, a second pole piece, and a gap layer which separates the first and the second pole pieces. The first pole piece includes a first bottom pole piece layer, a pedestal portion formed over the first pole piece layer, and a notched top pole portion formed over the pedestal portion. The pedestal portion has a first saturation magnetization $M_{S1}$ and the top pole portion has a second saturation magnetization $M_{S2}$ that is greater than the first saturation magnetization $M_{S1}$. In addition, the top pole portion has a substantially planar top surface over which a portion of the gap layer and the second pole piece are formed.

In accordance with the second inventive aspect, the method includes the acts of forming a first pole piece layer on a substrate; forming a pedestal portion over the first pole piece layer; and forming a top pole portion over the pedestal portion. The pedestal portion is formed with a first saturation magnetization $M_{S1}$ whereas the top pole portion is formed with a second saturation magnetization $M_{S2}$ that is greater than the first saturation magnetization $M_{S1}$. The top pole portion is also formed to have a substantially planar top surface over which a gap layer and second pole piece are positioned.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and MR magnetic read head and non-pedestal write head as seen in plane V—V of FIG. 2;

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
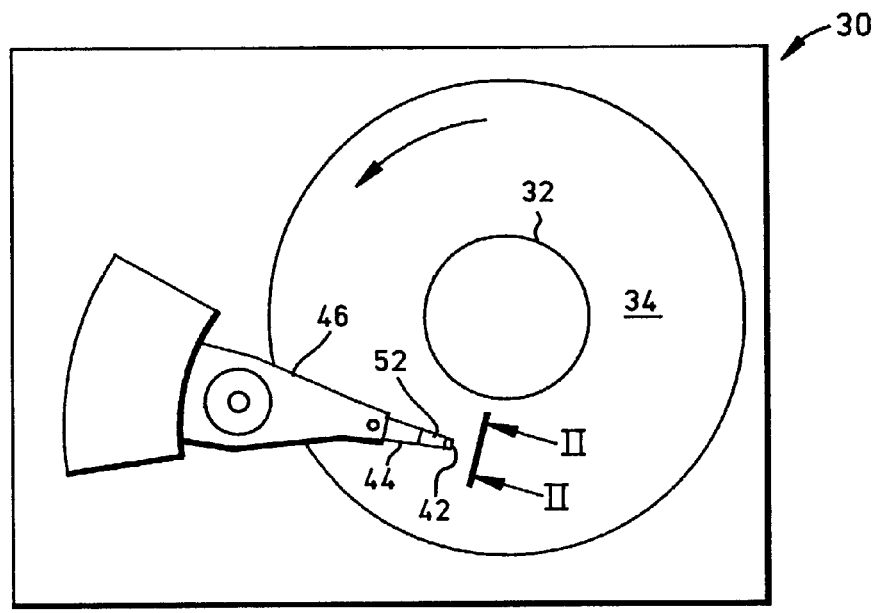
FIG. 1 is a planar view of an exemplary magnetic disk drive.
Figure 2:
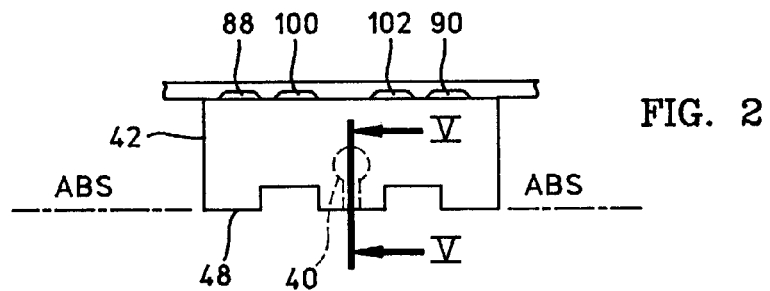
FIG. 2 is an end view of a slider with a magnetic head of the disk drive as seen in plane II—II.
Figure 3:
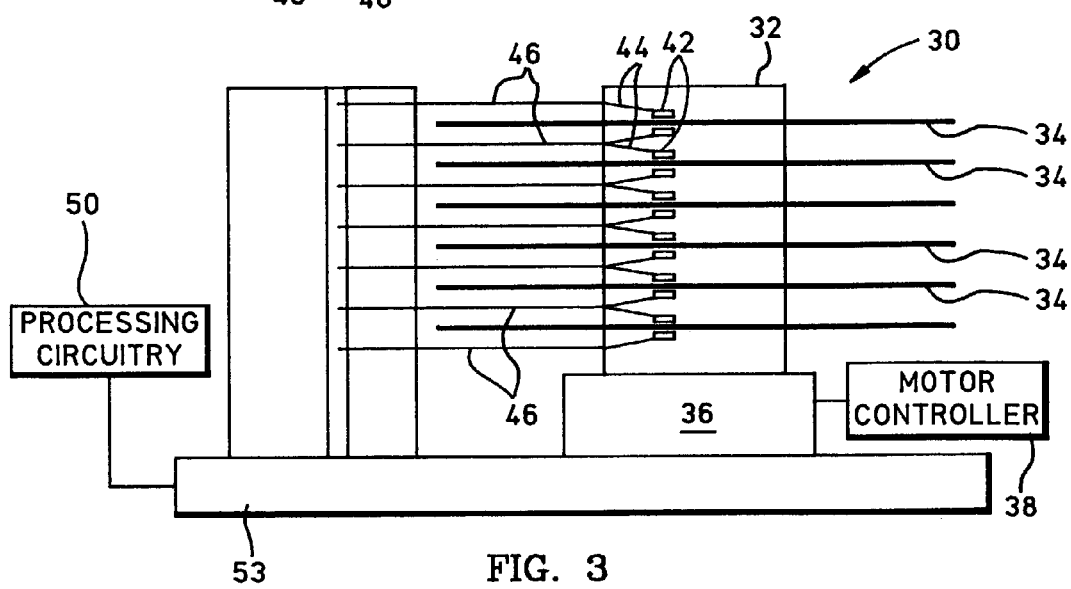
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a conventional magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 3. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 μm) cushion of air (air bearing) between the disk and an air bearing surface (ABS) 48.

Figure 4:
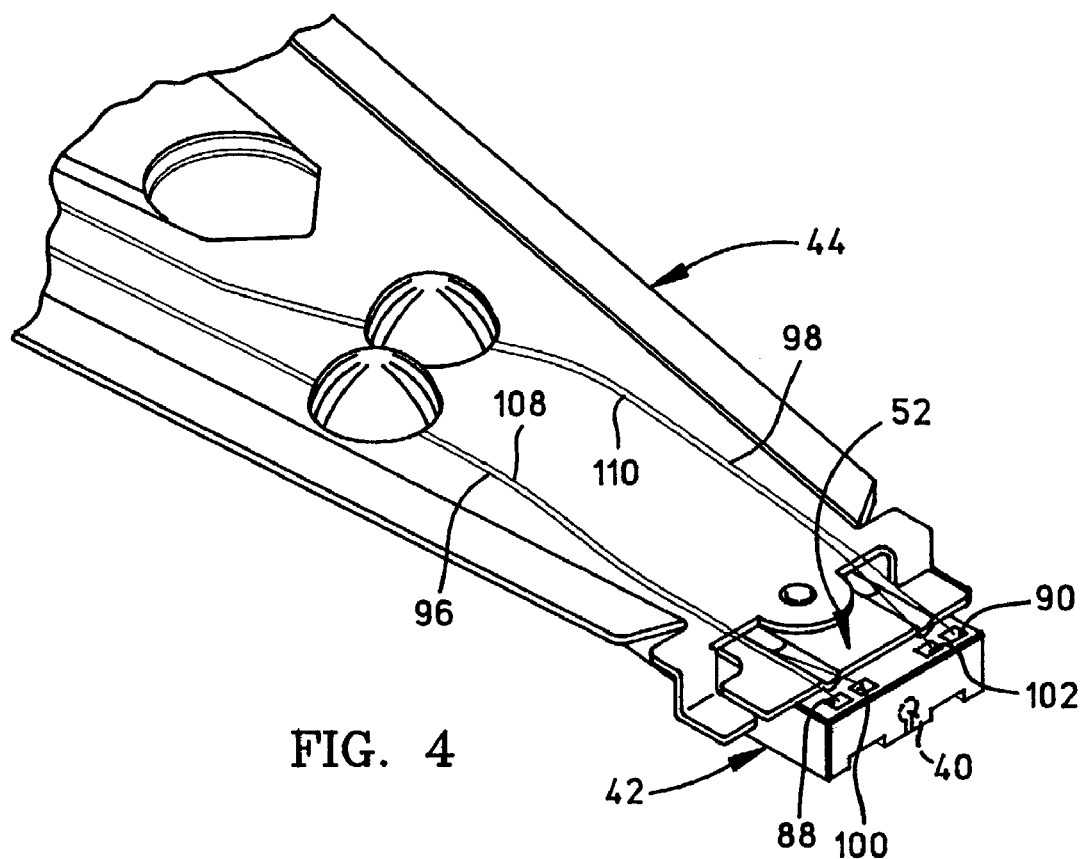
FIG. 4 is an isometric illustration of an exemplary suspension system for supporting the slider and magnetic head.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 52 that is mounted to the suspension 44. All of the above components are supported on a base 53.

FIG. 5 is a side cross-sectional elevation view of a conventional merged magnetoresistive (MR) head 40 having a write head portion 54 (non-pedestal type) and a read head portion 56. The read head portion includes an MR sensor 58. The MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes, which are processed by the processing circuitry 50 shown in FIG. 3.

Figure 6:
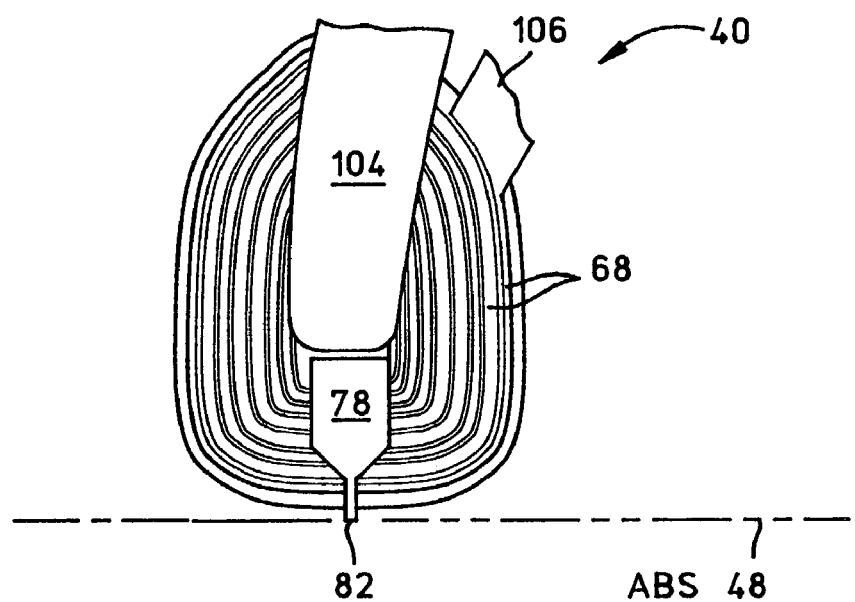
FIG. 6 is a top view of the second pole piece and coil layer, a portion of which is shown in FIG. 5, with all insulation material removed.
Figure 7:
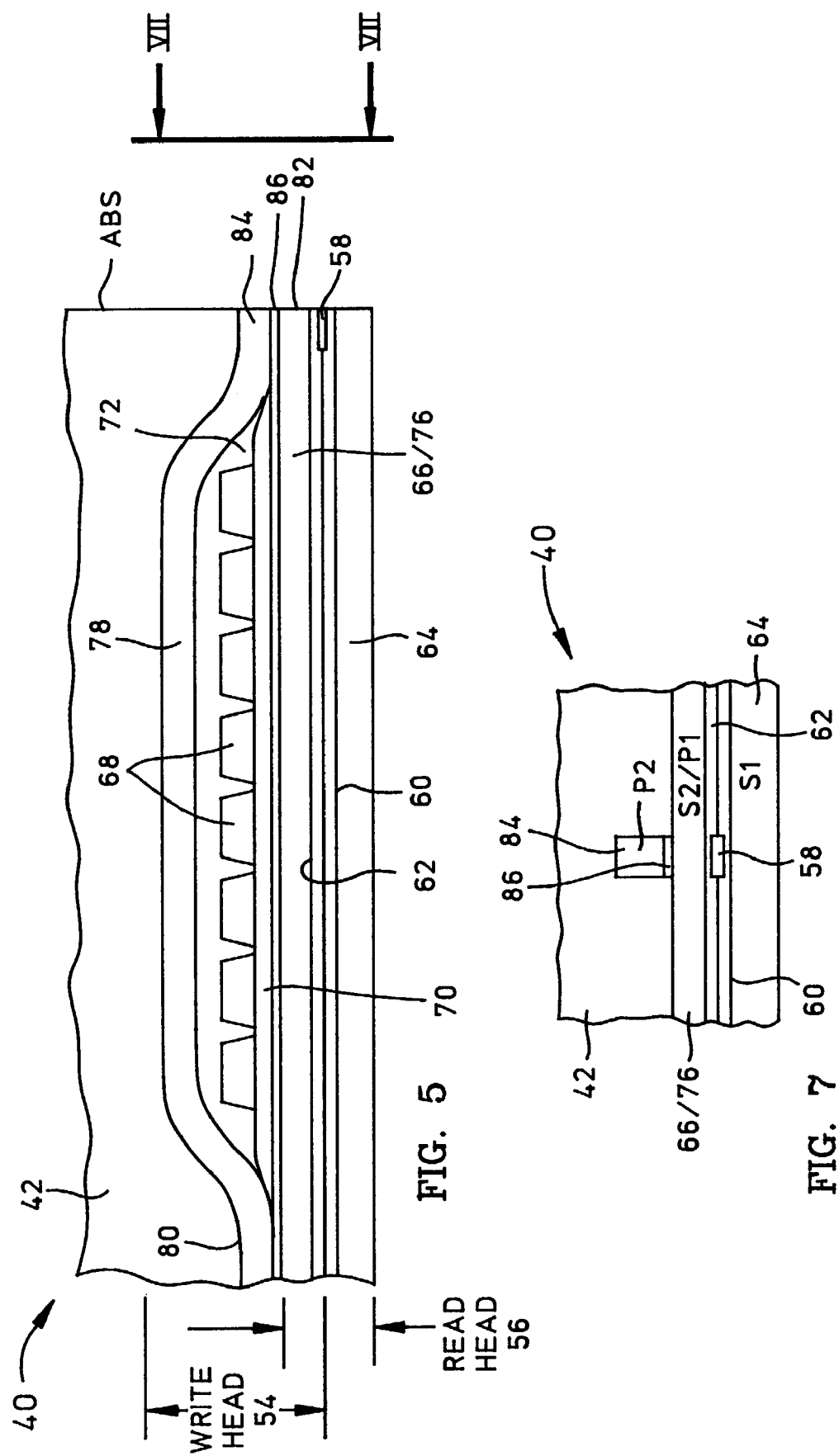
FIG. 7 is a partial ABS view of the slider taken along plane VII—VII of FIG. 5 to show the read and write elements of the magnetic head.

The write head portion 54 of the head includes a coil layer 68 sandwiched between first and second insulation layers 70 and 72. The first and second insulation layers 70 and 72 are referred to as an "insulation stack". The coil layer 68 and the first and second insulation layers 70 and 72 are sandwiched between first and second pole pieces 76 and 78. The first and second pole pieces 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from the MR sensor 58 to leads 96 and 98 on the suspension 44; third and fourth solder connections 100 and 102 connect leads 104 and 106 from the coil 68 (see FIG. 6) to leads 108 and 110 on the suspension.

Figure 8:
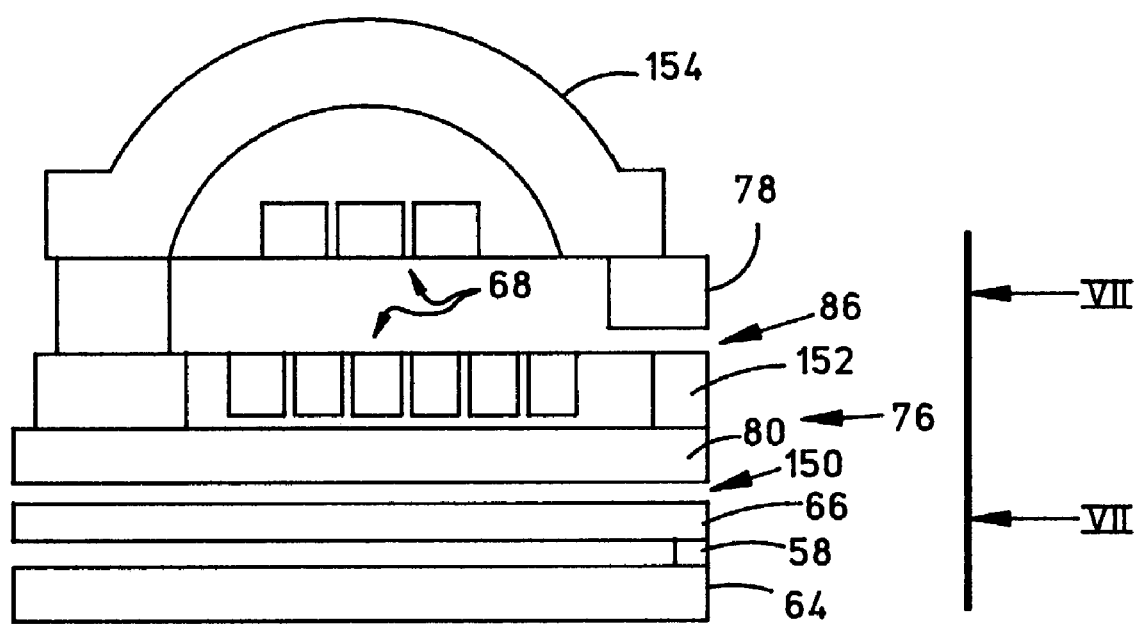
FIG. 8 is a partial elevation view of the slider and magnetic head as seen in plane V—V of FIG. 2, where the magnetic head includes a GMR read head portion and a pedestal write head.
Figure 9:
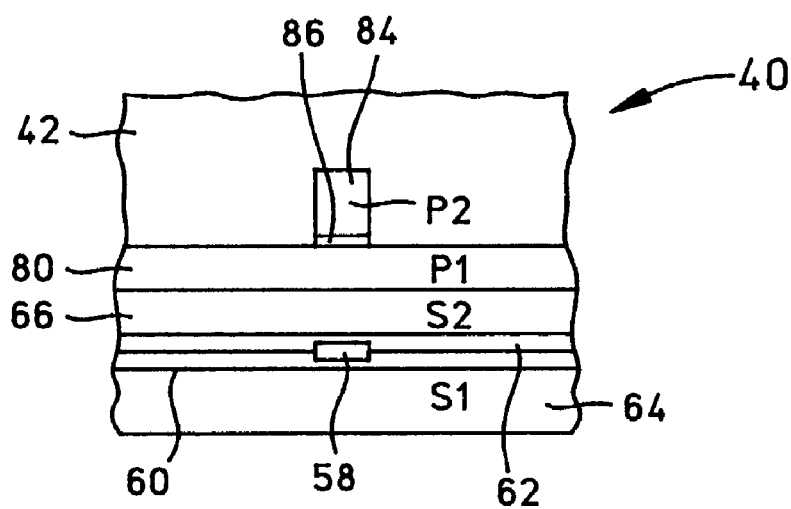
FIG. 9 is a partial ABS view of the slider taken along plane VII—VII of FIG. 5 to show the read and write elements of the magnetic head, which here includes a GMR read head portion.

FIG. 8 is a partial cross-sectional view of the conventional slider and magnetic head as seen in plane V—V of FIG. 2, where the magnetic head may include an MR or GMR sensor. Although many components in this head are the same as those in FIG. 5, some differences are apparent. For one, the head in FIG. 8 includes a pedestal-type write head wherein first pole piece 76 consists of a first pole piece layer 80 and a plated pedestal 152. Plated pedestal 152 is formed on first pole piece layer 80 by electro-plating and is made of a magnetic material with a high magnetic moment. Also, shield layer 66 and first pole piece layer 80 are not common layers; they are separate. Gap layer 86 separates plated pedestal 152 from second pole piece 84. A separating layer 150 may be formed between shield layer 66 and first pole piece layer 80. Finally, a third pole piece 154, which is formed on top of second pole piece 84, serves as a magnetic flux connecting layer. FIG. 9 is a partial ABS view of the slider taken along plane VII—VII of FIG. 5 to show the read and write elements of this magnetic head. As illustrated, an insulator material 1320 surrounds plated pedestal 1252. One skilled in the art will understand that variations on the magnetic heads shown and described above are also available. For example, the magnetic head in FIGS. 8–9 may incorporate a non-pedestal write head portion instead of a pedestal write head.

Figure 11:
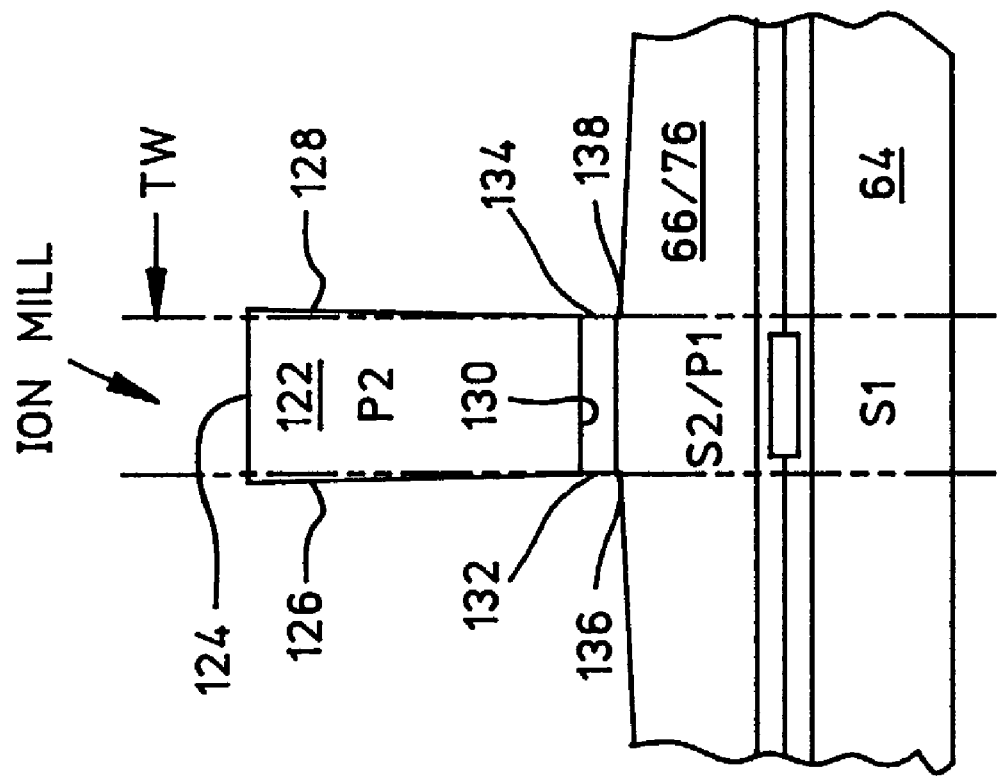
FIG. 11 is an ABS view of the prior art head of FIG. 10 after the first pole piece is formed with notches by milling.
Figure 10:
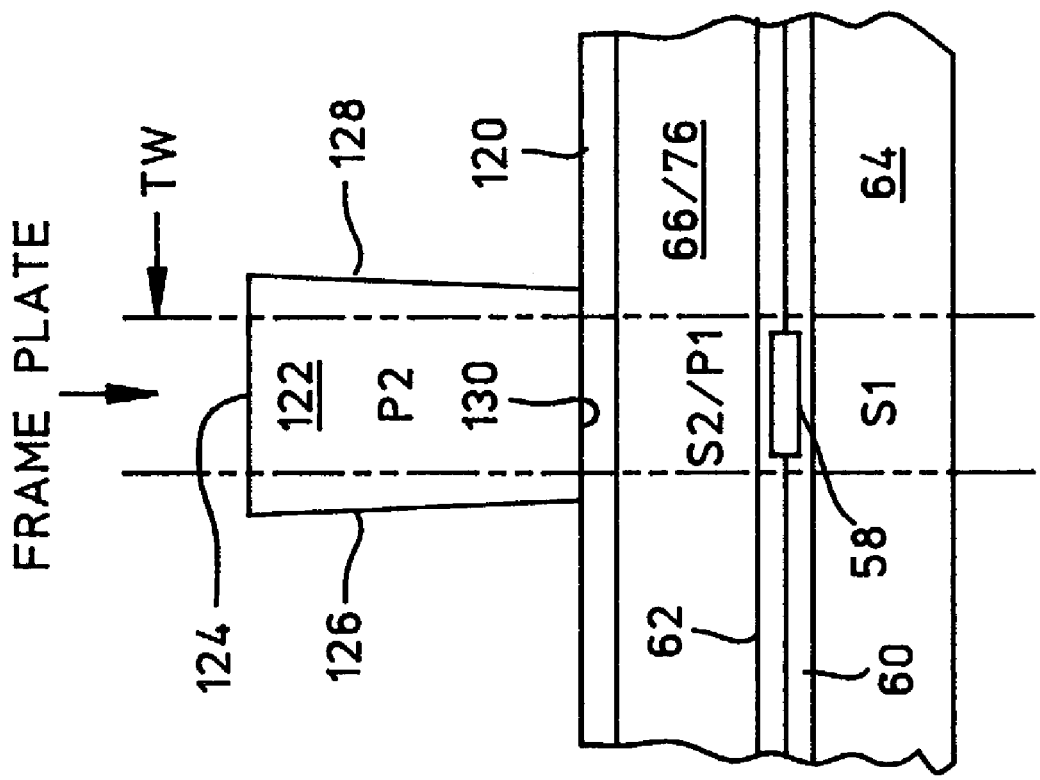
FIG. 10 is an ABS of a prior art head prior to notching the first pole piece.

FIGS. 10 and 11 are used to illustrate a conventional notching process. More particularly, FIG. 10 shows an ABS view of a conventional merged MR magnetic head, in which the second shield of the read head and the first pole piece of the write head are a common layer 66/76. Gap layer 120 has been formed on first pole piece layer 66/76, followed by frame plating a second pole tip 122 on gap layer 120. Second pole tip 122 is a front portion of the second pole piece. Second pole tip is bounded by a top 124, first and second side walls 126 and 128, and a base 130. The target track width (TW) is shown in FIG. 10. Since the first pole piece will be notched by ion milling, second pole tip 122 is larger than a target size track width (TW) of the second pole tip, so as to allow for consumption of the second pole tip during a subsequent milling cycle. Accordingly, before milling, first and second side walls 126 and 128 extend beyond the track width, and top 124 is higher than the target height.

In FIG. 11 ion milling is employed to mill through the gap layer to form a write gap 130 with first and second side walls 132 and 134, and to mill notches into the first pole piece 66/76 with first and second side walls 136 and 138. After milling, the first side walls 126, 132 and 136 are contiguous, and the second side walls 128, 134 and 138 are contiguous. This notching improves the transfer of flux between the second pole tip 122 and the first pole piece 66/76, since the flux will transfer to the pedestal portion of the first pole piece instead of the larger expanse thereof. This reduces side writing by the write head. The milling is at an angle to a normal to the layers 66/76 and 64 in order to minimize redeposition of the milled material. It should be understood that the partially completed magnetic head in FIG. 11 rests upon a substrate (not shown) that is rotated during the milling cycle. The second pole tip is employed as a mask for forming the write gap 130 and notching the first pole piece at 136 and 138.

Figure 12:
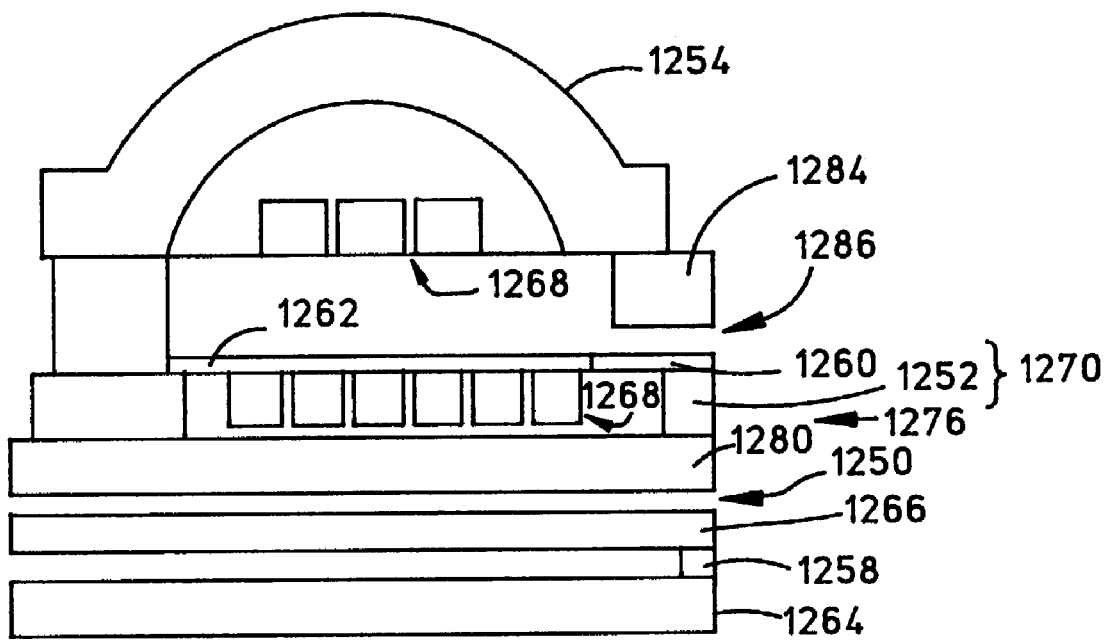
FIG. 12 is a partial elevation view of the slider and magnetic head of the present invention, which includes a GMR sensor.
Figure 13A:
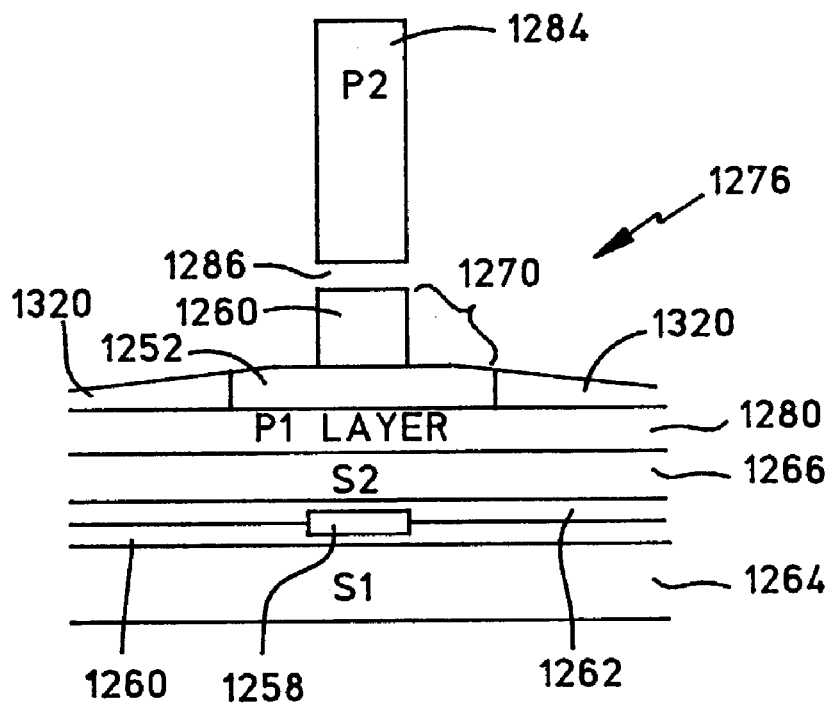
FIG. 13A is a partial ABS view of the slider to show the read and write elements of the magnetic head of the present invention of FIG. 12, which here includes the GMR sensor.

FIG. 12 shows a partial cross-sectional view of a magnetic head in accordance with one embodiment of the present invention. In this embodiment, the magnetic head is of the GMR type. FIG. 13A shows the same magnetic head in a partial ABS view. The magnetic head generally includes a first pole piece 1276 and a second pole piece 1284. First pole piece 1276 includes a first pole piece layer 1280 and a first pole tip structure 1270 formed on top of first pole piece layer 1280. First pole tip structure 1270, which may be referred to as a bilayer pole tip, is separated from the pole tip of second pole piece 1284 by a gap layer 1286. A separation layer 1250 separates a second shield layer 1266 from first pole piece 1276. A third pole piece 1254, which serves as a magnetic connecting layer, is formed on top of second pole piece 1284. Conventional write coils 1268 are also formed within the magnetic head. In addition, a GMR sensor 1258 is sandwiched in between first and second shield layers 1264 and 1266.

First pole piece 1276 and second pole piece 1284 may be made of any suitable magnetic material, preferably one with a high magnetic moment, such as various compositions of NiFe alloys, CoFe alloys, or FeAlN, with the inclusion of other common additives or dopants to control its material properties. Gap layer 1286 may be made of alumina ($Al_2O_3$) or other suitable non-magnetic material. The thickness of gap layer 1286 preferably varies between about 100 and 2000 Angstroms, and in the present embodiment it has a thickness of about 1000 Angstroms.

First pole tip structure 1270 includes a pedestal portion 1252 and a top pole portion 1260. Pedestal portion 1252 is an electrically plated structure and therefore may be referred to as a plated pedestal. Pedestal portion 1252 is made from a magnetic material having a relatively high magnetic moment, preferably between about 1.7 and 2.5 Tesla. For example, pedestal portion 1252 may be made from any suitable material, such as various compositions of NiFe alloys, CoFe alloys, or FeAlN, with the inclusion of other common additives or dopants to control its material properties. Pedestal portion 1252 is surrounded by insulator materials 1320, such as alumina ($Al_2O_3$). The thickness or height of pedestal portion 1252 is preferably between about 0.5–5.0 µm, and in the present embodiment has a particular thickness of about 3.0 µm. The width of pedestal portion 1252 is preferably greater than 2 µm. Pedestal portion is a structure that may or may not have been notched by milling. In the preferred embodiment, pedestal portion 1252 has not been notched.

Top pole portion 1260 is formed directly on pedestal portion 1252 and lies directly underneath gap layer 1286. Top pole portion 1260 may be referred to as a "P1 cap". Preferably, top pole portion 1260 is formed over pedestal portion 1252 by sputter deposition, but any other suitable technique such as electro-plating may be utilized. Also, top pole portion 1260 has been notched by milling as previously described, resulting in straight or angled side walls (straight sidewalls shown in FIG. 13A). Top pole portion 1260 is made from a magnetic material having a relatively high magnetic moment, preferably between about 1.7 and 2.5 Tesla. For example, top pole portion 1260 may be made from any suitable material, such as various compositions of NiFe alloys, CoFe alloys, or FeAlN, with the inclusion of other common additives or dopants to control its material properties. The thickness or height of top pole portion 1260 is preferably between 500–5000 Angstroms, and in this embodiment has a particular thickness of about 3000 Angstroms. Preferably, the thickness of top pole portion 1260 is related or linked to the thickness of gap layer 1286. For example, the thickness of top pole portion 1260 may be about twice the thickness of gap layer 1286 plus an additional 1000 Angstroms.

Pedestal portion 1252 has a first saturation magnetization $M_{S1}$ and top pole portion 1260 has a second saturation magnetization $M_{S2}$ that is greater than the first saturation magnetization $M_{S1}$. As one skilled in the art will readily appreciate, the saturation magnetizations are provided upon the electroplating or deposition of the materials by physical vapor deposition techniques such as sputtering, ion beam deposition, or any other suitable technique. High temperature annealing may also be used to improve the magnetic properties of the material.

The second saturation magnetization $M_{S2}$ may be greater than the first saturation magnetization $M_{S1}$ by any percentage that results in improved properties. Thus, top pole portion 1260 may be referred to as a high $M_s$ layer or structure. Preferably, however, the second saturation magnetization $M_{S2}$ is at least 5% greater than the first saturation magnetization $M_{S1}$. Also preferably, given the present state of the art, pedestal portion 1252 has a first saturation magnetization $M_{S1}$ of between about 1.7–2.5 Tesla, and a particular saturation magnetization $M_{S1}$ of about 2.0 Tesla in the present embodiment; top pole portion 1260 has a second saturation magnetization $M_{S2}$ of between about 2.0–2.5 Tesla, and a particular saturation magnetization $M_{S2}$ of about 2.3 Tesla in the present embodiment. Thus, in the present embodiment top pole portion 1260 has a saturation magnetization that is 15% greater than that of pedestal portion 1252.

Figure 13B:
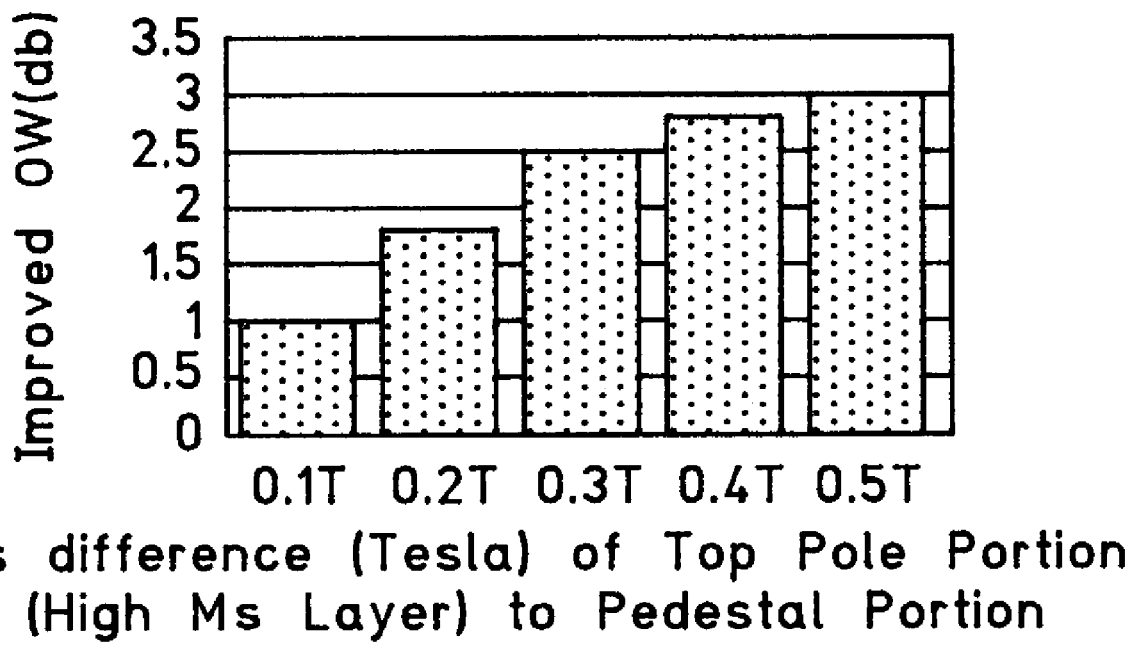
FIG. 13B is a graph showing the improved overwrite (OW) capabilities of the inventive magnetic head at different saturation magnetizations of the top pole portion of the bilayer pole tip of FIGS. 12 and 13A.

FIG. 13B is a graph 1350 which shows examples of the improved overwrite (OW) capabilities of the inventive magnetic head at different saturation magnetizations of the top pole portion ($B_S=4\Pi M_S$). As apparent, graph 1350 shows between a 1–3 dB gain improvement in OW for the magnetic head. Also, there is a reduction in the fringing field of 30–60 Oersteds (out of 2500 Oersteds). As one skilled in the art will readily appreciate, the fringing field is the magnetic field that extends to the adjacent track when the current track is being written to.

It is noted that the length or throat height of the top pole portion relative to the pedestal portion directly affects these performance parameters. More particularly, if the throat height of the top pole portion is long relative to the pedestal portion, then OW gain is lost but the fringing field gradient is improved. On the other hand, if the throat height of the top pole portion is short relative to the pedestal portion, then there is more OW gain but less fringing field improvement. This is illustrated in Table 1 below, which shows data for OW, fringing field, and inductance for relative differences in throat heights of the top pole portion (P1 cap) and the P1 pedestal portion given a fixed difference in $B_S$ of 0.1 Tesla.

TABLE 1

Exemplary Performance Data For Relative Differences In Throat Heights For P1 Cap And P1 Pedestal At A Fixed Difference In $B_S$ (0.1 Tesla).

| P1 CAP THROAT - P1 PEDESTAL THROAT | OVER-WRITE | FRINGING FIELD | INDUCTANCE |
| --- | --- | --- | --- |
| −1.0 µm | +1.2 dB | +140 Oe | −8% |
| −0.5 µm | +0.5 dB | +40 Oe | −4% |
| 0.0 µm | reference | reference | reference |
| +0.5 µm | −0.2 dB | −20 Oe | +11% |
| +1.0 µm | −0.4 dB | −30 Oe | +25% |

As apparent from the description herein, first pole tip structure 1270 may be referred to as a bilayer or multilayer pole tip having two layers. However, other additional or intervening layers may be utilized in this structure without adversely affecting its properties to form a multilayer structure having more than two layers. Also, as will be more apparent from the cross-sectional views to follow, this bilayer pole tip structure is advantageously formed so as to form a substantially planar surface over which the second pole piece is formed.

Several methods of making a magnetic head according to the present invention will now be described. Each method is illustrated by a series of grouped drawings in FIGS. 14A–14D, FIGS. 15A–15E, 16A–16E, 17A–17E, 18A–18D, 19A–19D, and 20A–20D. The specific materials, material thicknesses, material properties, etc. described above in relation to FIGS. 12–13 may be applied in these methods, although they may not explicitly mentioned in the text below. Although several different methods are described below, one ordinarily skilled in the art will appreciate that other variations may be realized as well.

Figure 14A:
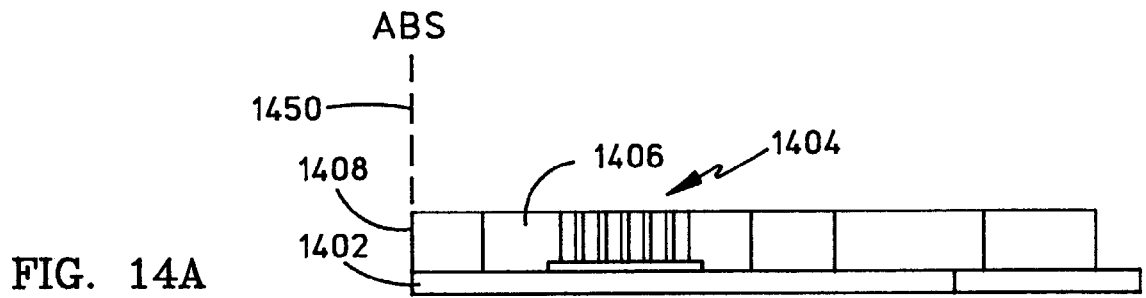
FIGS. 14A–14E are a series of illustrations used to describe a method of making an inventive magnetic head in accordance with the present invention.
Figure 14B:
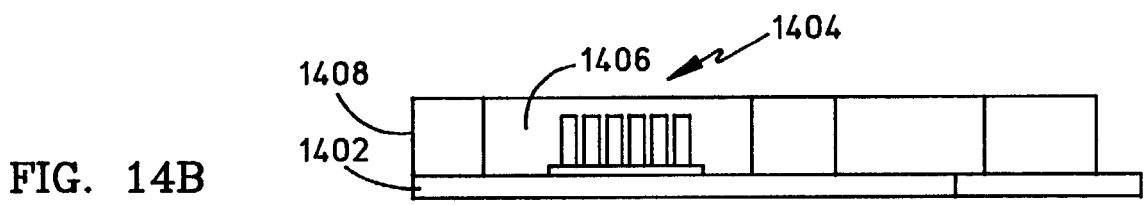

A first method of making a magnetic write head having a bilayer pole tip is described in relation to FIGS. 14A–14D. Beginning with FIG. 14A, a first pole piece layer 1402 ("P1") is formed over a substrate by frame plating. The substrate may be any underlying component or layer, such as a shield layer (which is covered by an insulator layer) or a second gap layer. Next, write coils 1404 are formed over an insulator on top of first pole piece layer 1402. Write coils 1404 are protected with a surrounding insulator 1406, which may be a hard bake resist, alumina ($Al_2O_3$), or other suitable insulative material. A pedestal 1408 is then frame plated over first pole piece layer 1402 as part of the pole tip after etching away insulator materials in front and in the back gap regions. Preferably, plated pedestal 1408 is initially plated to a thickness between about 0.5–5.0 µm, and preferably to a thickness of about 3.0 µm. Alternatively, the pedestal may be plated prior to the formation of the coils and insulator. Another insulator (not shown in FIG. 14A), which may be alumina, hard bake resist, or other suitable insulative material, is then deposited over first pole piece layer 1202 and plated pedestal 1302. Next, a chemical mechanical polishing (CMP) is performed on a top surface of the structure to remove top insulator materials and to expose a top of plated pedestal 1408 such that the top surfaces of both insulator 1406 and plated pedestal 1408 are coplanar. Plated pedestal 1408 is thereby formed into the bottom pedestal portion of the bilayer pole tip. The resulting structure is shown in FIG. 14A. Alternatively, in the preferred embodiment, the coils are buried below the insulating material so that they are not exposed on the surface after the CMP step. This alternative resulting structure, shown in FIG. 14B, protects the coils from subsequent processing, such as the processing of the second pole piece (P2) or any ion milling performed over the coils.

Figure 14C:
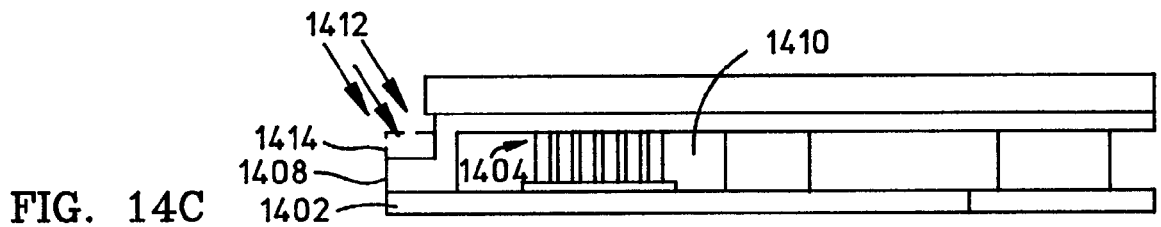

In FIG. 14C, a photoresist mask 1410 is formed slightly behind the ABS to mask the entire structure except for a top portion of plated pedestal 1408 which remains exposed. In this embodiment, photoresist mask 1410 is a bi-layer lift off mask which includes a top photoresist layer and a bottom release layer (such as PMGI). The exact position of the photoresist mask's edge (an example of which is shown) determines the P1 cap throat height, which is set to provide the desired write head performance considering its impact on the fabrication of the second pole piece. Next, ion milling is performed as indicated by arrows 1412 to remove a top portion 1414 of plated pedestal 1408. The resulting structure is shown in FIG. 14C. Behind the removed top portion 1414 of plated pedestal 1408 (i.e. away from the ABS) is a top remaining portion of plated pedestal 1408 which is positioned underneath photoresist mask 1410. Optionally, the entire top portion of plated pedestal 1408 and a portion of the insulator may be removed, but this may be less desirable due to the differential removal rates of the pedestal (e.g. Permalloy) and insulator.

Figure 14D:
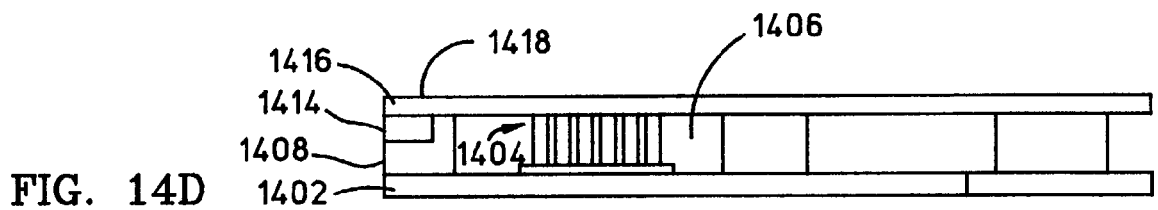

In FIG. 14D, a high $M_S$ material is then sputter deposited within the removed top portion 1414 of plated pedestal 1408 and forms a high $M_s$ layer 1414. This deposition is suitably controlled in time or by an end point detection technique such that a top surface of high $M_s$ layer 1414 becomes substantially flush with top surfaces of insulator 1406 and plated pedestal 1408. These surfaces together form a substantially planar top surface as shown. Next, the photoresist mask 1410 (shown in FIG. 14C) is removed using a suitable solvent to dissolve its release layer. A light CMP may be performed on the entire top surface to ensure its planarity or to fix any irregularities. A gap layer 1418 is then deposited over the entire structure. Since gap layer 1418 was deposited over a substantially planar surface, gap layer 1418 also has a substantially planar top surface. The resulting structure is shown in FIG. 14D.

Figure 14E:
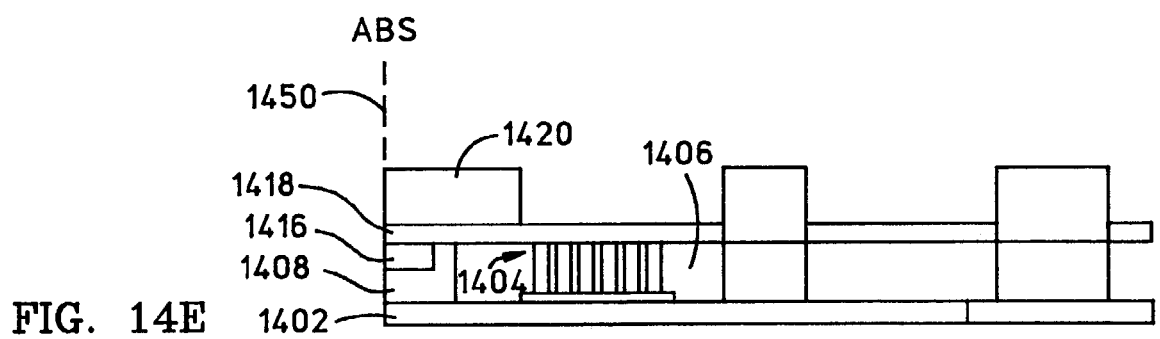

In FIG. 14E, a second pole piece 1420 ("P2") is then formed over that portion of gap layer 1418 that resides above the pole tip and over a portion of insulator 1406, as shown. P2 formation may be done using well-known techniques, such as electrical is frame plating, or image transfer of a P2 pattern by reactive ion etching (RIE) into a hardmask and suitable dielectric material. In one embodiment, second pole piece 1420 is formed on top of a high moment seed layer (not shown) which has a $M_S$ greater than the $M_S$ of second pole piece 1420. Therefore, the highest magnetic moment material (seed layer) is directly adjacent to the write gap. After P2 is formed, high $M_s$ layer 1414 is notched using conventional ion milling techniques, where the second pole piece 1420 is used as a milling mask. High $M_s$ layer 1414 is thereby formed into the top pole portion of the bilayer pole tip. The resulting structure is shown in FIG. 14E, which may have one of the ABS views shown in FIG. 12 or 13A. Plated pedestal 1408 and high $M_s$ layer 1414 together make up the bilayer pole tip of the first pole piece. Other conventional steps may complete formation of the magnetic head. For example, a second coil layer (and perhaps additional coil layers) is subsequently formed, followed by the formation of a third pole piece ("P3") which is a magnetic flux connecting layer positioned on top of P2 and (optionally) recessed from the ABS.

Figure 15A:
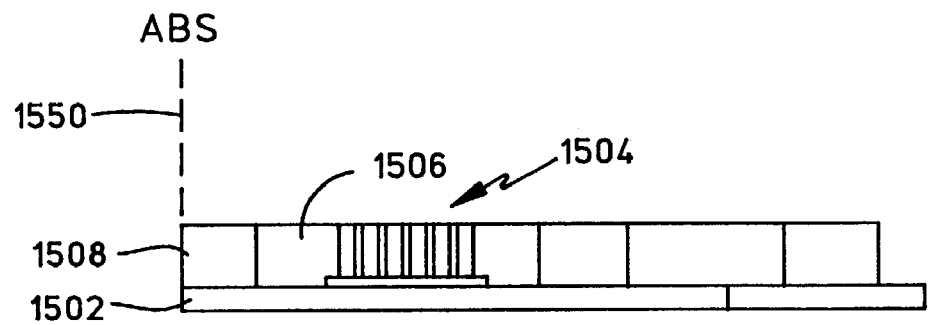
FIGS. 15A–15D are a series of illustrations used to describe another method of making a magnetic head in accordance with the invention.

Another method of making a magnetic write head having a bilayer pole tip is described in relation to FIGS. 15A–15D. Beginning with FIG. 15A, a first pole piece layer 1502 ("P1") is formed on a substrate by frame plating. The substrate may be any underlying component or layer, such as a shield layer (which is covered by an insulator layer) or a second gap layer. Next, write coils 1504 are formed over an insulator on top of first pole piece layer 1502. Write coils 1504 are protected with a surrounding insulator 1506, which may be a hard bake resist, alumina ($Al_2O_3$), or other suitable insulative material. Pedestal 1508 is then frame plated over first pole piece layer 1502 as part of the pole tip after etching away insulator materials in front and in the back gap regions. Preferably, plated pedestal 1508 is initially plated to a thickness between about 0.5–5.0 μm, and preferably to a thickness of about 3.0 μm. Alternatively, the pedestal may be plated prior to the formation of the coils and insulator. Another insulator (not shown in FIG. 15A), which may be alumina, hard bake resist, or other suitable insulative material, is then deposited over first pole piece layer 1502 and plated pedestal 1508. Next, CMP is performed on a top surface of the structure to remove top insulator materials and to expose a top of plated pedestal 1508 such that the top surfaces of both insulator 1506, plated pedestal 1508, and write coils 1504 are coplanar. Plated pedestal 1508 is thereby formed into the bottom pedestal portion of the bilayer pole tip. The resulting structure is shown in FIG. 15A. Alternatively, a resulting structure similar to that shown and described in relation to FIG. 14B may be formed.

Figure 15B:
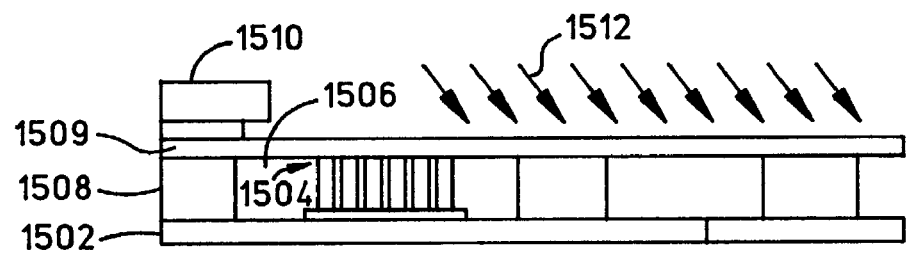

In FIG. 15B, a high $M_S$ material 1509 is then sputter deposited over the entire structure (including top surfaces of insulator 1506 and plated pedestal 1508). Next, a photoresist mask 1510 is formed to define the geometry of high $M_S$ material 1509 and to protect plated pedestal 1508. In this embodiment, photoresist mask 1510 includes a top photoresist layer and a bottom release layer (such as PMGI) underneath the photoresist layer. The exact position of the photoresist mask's edge (an example of which is shown) determines the P1 cap throat height, which is set to provide the desired write head performance considering its impact on the fabrication of the second pole piece. In one embodiment, the photoresist mask's edge is placed closer towards the ABS than the back edge of the pedestal, providing tighter control on the zero throat height of the head. Next, ion milling is performed as indicated by arrows 1512 to remove the exposed high $M_s$ material and to reach the top of insulator 1506 or the top of write coils 1504.

Figure 15C:
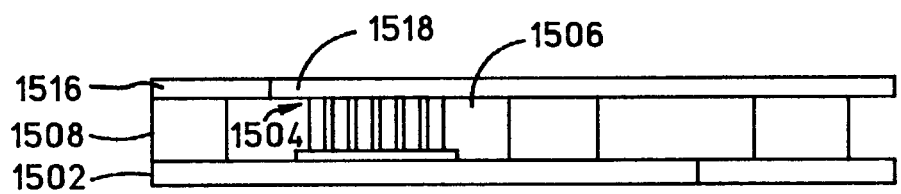

In FIG. 15C, a high $M_s$ layer 1516 formed underneath the mask from the ion milling is shown. This layer 1516 is the top pole portion of the bilayer pole tip. An insulator layer 1518 is then deposited over the structure including the photoresist mask 1510 (FIG. 15C). Insulator layer 1518 may be made of alumina ($Al_2O_3$), $SiO_2$, other suitable dielectric material. The thickness of insulator layer 1518 is targeted to match the thickness of layer 1509/1516, in order to ensure planarity of the final structure. This deposition is suitably controlled in time or by an end point detection technique such that a top surface of insulator layer 1518 becomes substantially flush with a top surface of remaining high $M_s$ layer 1516. These surfaces together form a substantially planar top surface as shown. Next, the photoresist mask 1410 (FIG. 15C) is removed using a suitable solvent to dissolve its release layer. A light CMP may be performed on this entire top surface to ensure its planarity or to fix any irregularities. The resulting structure is shown in FIG. 15C.

Figure 15D:
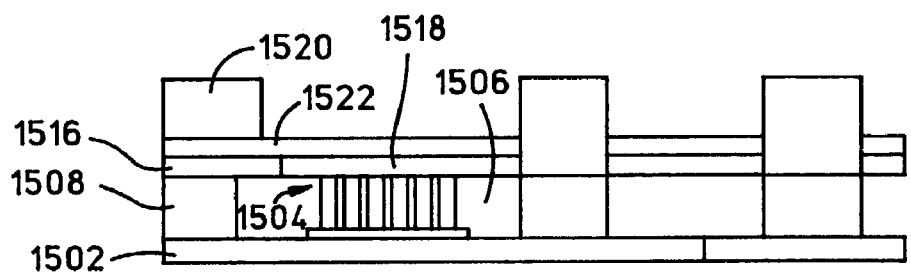

In FIG. 15D, a gap layer 1522 is then deposited over the entire structure, including over high $M_s$ layer 1516 and insulator layer 1518. Since gap layer 1522 was deposited over a substantially planar surface, gap layer 1522 also has a substantially planar top surface. A second pole piece 1520 ("P2") is then formed over that portion of gap layer 1522 that resides above the pole tip and insulator 1506, as shown. P2 formation may be done using well-known techniques, such as electrical frame plating, or image transfer of a P2 pattern by RIE into a hardmask and suitable dielectric material. In one embodiment, second pole piece 1520 is formed on top of a high moment seed layer (not shown) which has a $M_S$ greater than the $M_S$ of second pole piece 1520. Therefore, the highest magnetic moment material (seed layer) is directly adjacent to the write gap. After P2 is formed, high $M_s$ layer 1516 is notched using conventional ion milling techniques where the second pole piece 1520 is used as a milling mask. The resulting structure is shown in FIG. 15D, which may have one of the ABS views shown in FIG. 12 or 13A. Plated pedestal 1508 and high $M_s$ layer 1516 form the bilayer pole tip of the first pole piece. Other conventional steps may complete formation of the magnetic head. For example, a second coil layer (and perhaps additional coil layers) is subsequently formed, followed by the formation of a third pole piece ("P3") which is a magnetic flux connecting layer positioned on top of P2 and (optionally) recessed from the ABS.

Figure 16A:
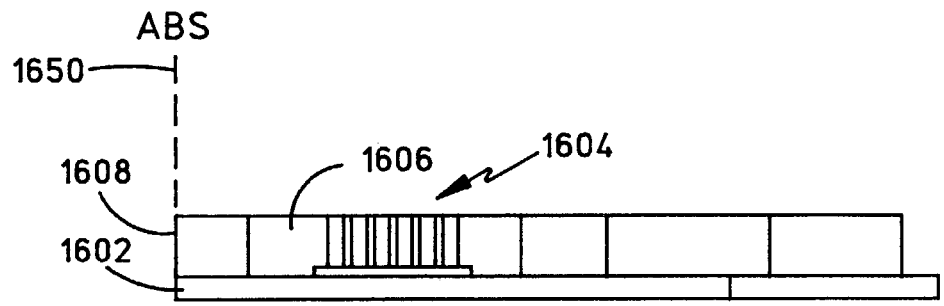
FIGS. 16A–16E are a series of illustrations used to describe yet another method of making a magnetic head in accordance with the invention.

Even another method of making a magnetic write head having a bilayer pole tip is described in relation to FIGS. 16A–16E. Beginning with FIG. 16A, a first pole piece layer 1602 ("P1") is formed on a substrate by frame plating. The substrate may be any underlying component or layer, such as a shield layer (which is covered by an insulator layer) or a second gap layer. Next, write coils 1604 are formed over an insulator on top of first pole piece layer 1602. Write coils 1604 are protected with a surrounding insulator 1606, which may be a hard bake resist, alumina ($Al_2O_3$), or other suitable insulative material. A pedestal 1608 is then frame plated over first pole piece layer 1602 as part of the pole tip after etching away insulator materials in front and in the back gap regions. Preferably, plated pedestal 1608 is plated to an initial thickness between about 0.5–5.0 μm, and preferably to a thickness of about 3.0 μm. Alternatively, the pedestal may be plated prior to the formation of the coils and insulator. Another insulator (not shown in FIG. 16A), such as alumina, hard bake resist, or other suitable insulative material, is then deposited over first pole piece layer 1602 and plated pedestal 1608. Next, CMP is performed on a top surface of the structure to remove top insulator materials and to expose a top of plated pedestal 1608 such that the top surfaces of both insulator 1606 and plated pedestal 1608 are coplanar. Plated pedestal 1608 is thereby formed into the bottom pedestal portion of the bilayer pole tip. The resulting structure is shown in FIG. 16A. Alternatively, a resulting structure similar to that shown and described in relation to FIG. 14B may be formed.

Figure 16B:
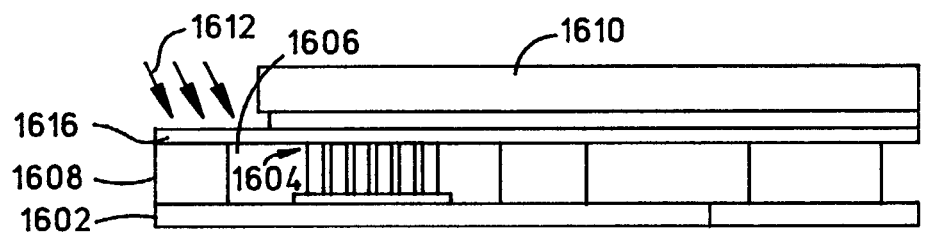
Figure 16C:
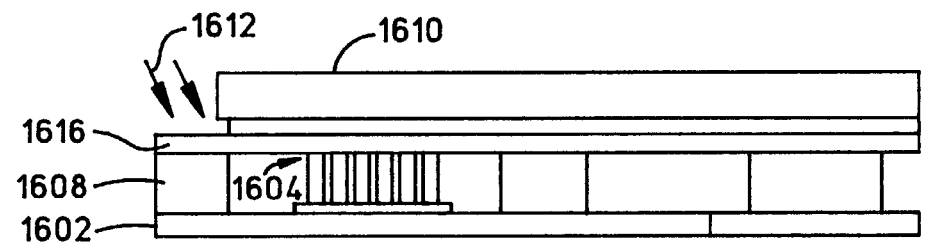

In FIG. 16B, an insulator layer 1616 is then deposited over the entire structure. Insulator layer 1616 may be made of alumina ($Al_2O_3$), $SiO_2$, other suitable dielectric material. Insulator layer 1616 is deposited to a thickness that is the same as the desired thickness of the top pole portion of the bilayer pole tip. Since insulator layer 1616 was deposited over a substantially planar surface, insulator layer 1616 also has a substantially planar top surface. A photoresist mask 1610 is then formed slightly behind the ABS to mask the entire structure except for an exposed portion of insulator layer 1616 that resides over plated pedestal 1608 and a front portion of insulator 1606, as shown. Alternatively as shown in FIG. 16C, photoresist mask 1610 may be positioned closer toward the ABS to cover only that portion of insulator layer 1616 that resides over plated pedestal 1608. The exact position of the photoresist mask's edge (examples of which are shown) determines the P1 cap throat height, which is set to provide the desired write head performance considering its impact on the fabrication of the second pole piece. In one representative embodiment, the photoresist mask's edge is placed closer towards the ABS than the back edge of the pedestal, providing tighter control on the zero throat height of the head. Next, ion milling or reactive ion milling (RIE) is performed as indicated by arrows 1612 to remove the top portion of insulator layer 1616 that resides over plated pedestal 1608. This is done until a top surface of plated pedestal 1608 is exposed. Alternatively, a wet etch (chemical etch) may be performed to remove the top portion of insulator layer 1616.

Figure 16D:
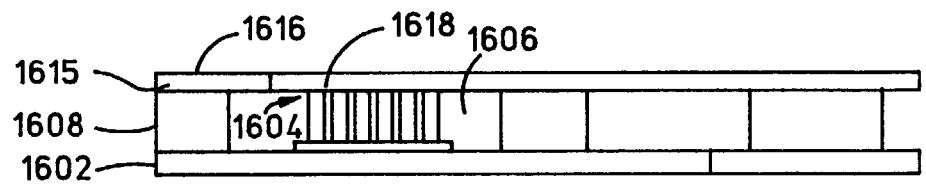

In FIG. 16D, a high $M_S$ material is then sputter deposited within the removed insulator layer portion 1615 to form a high $M_s$ layer 1616 over plated pedestal 1608 (and optionally over the front top portion of insulator 1606). This deposition is suitably controlled in time or by an end point detection technique such that a top surface of high $M_s$ layer 1616 becomes substantially flush with a top surface of insulator layer 1618. These surfaces together form a substantially planar top surface as shown. High $M_s$ layer 1616 is thereby formed into the top pole portion of the bilayer pole tip. Next, the photoresist mask 1610 (shown in FIGS. 16B–16C) is removed using a suitable solvent to dissolve its release layer. A light CMP may be performed on this entire top surface to ensure its planarity or to fix any surface irregularities. The resulting structure is shown in FIG. 16D.

Figure 16E:
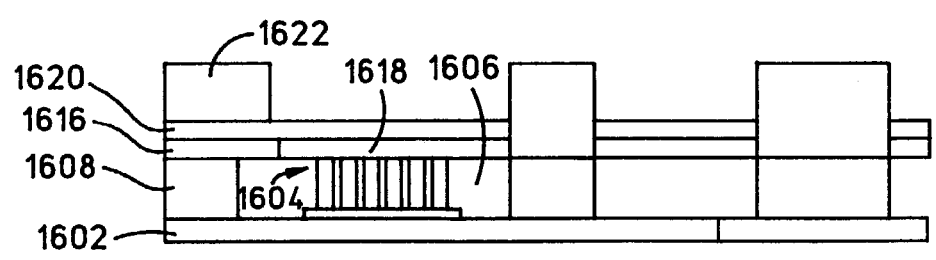

In FIG. 16E, a gap layer 1620 is then deposited over the entire structure, including over high $M_s$ layer 1616 and insulator layer 1618. Since gap layer 1620 was deposited over a substantially planar surface, gap layer 1620 also has a substantially planar top surface. A second pole piece 1622 ("P2") is then formed over that portion of gap layer 1620 that resides above the pole tip and insulator 1606, as shown. P2 formation may be done using well-known techniques, such as electrical frame plating, or image transfer of a P2 pattern by RIE into a hardmask and suitable dielectric material. In one embodiment, second pole piece 1622 is formed on top of a high moment seed layer (not shown) which has a $M_S$ greater than the $M_S$ of second pole piece 1622. Therefore, the highest magnetic moment material (seed layer) is directly adjacent to the write gap. After P2 formation, high $M_s$ layer 1616 is notched using conventional ion milling techniques where the second pole piece 1622 is used as a milling mask. The resulting structure is shown in FIG. 16E, which may have one of the ABS views shown in FIG. 12 or 13A. Plated pedestal 1608 and high $M_s$ layer 1616 form the bilayer pole tip of the first pole piece. Other conventional steps may complete formation of the magnetic head. For example, a second coil layer (and perhaps additional coil layers) is subsequently formed, followed by the formation of a third pole piece ("P3") which is a magnetic flux connecting layer positioned on top of P2 and (optionally) recessed from the ABS.

Figure 17A:
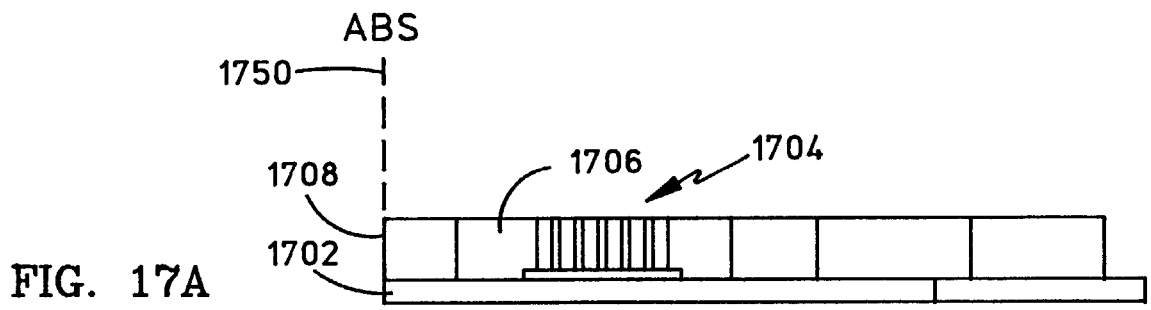
FIGS. 17A–17E are a series of illustrations used to describe even another method of making a magnetic head in accordance with the invention.

Another method of making a magnetic write head having a bilayer pole tip is described in relation to FIGS. 17A–17E. Beginning with FIG. 17A, a first pole piece layer 1702 ("P1") is formed over a substrate by frame plating. The substrate may be any underlying component or layer, such as a shield layer (which is covered by an insulator layer) or a second gap layer. Next, write coils 1704 are formed over an insulator on top of first pole piece layer 1702. Write coils 1704 are protected with a surrounding insulator 1706, which may be a hard bake resist, alumina ($Al_2O_3$), or other suitable insulative material. A pedestal 1708 is then frame plated over first pole piece layer 1702 as part of the pole tip after etching away insulator materials in front and in the back gap regions. Preferably, plated pedestal 1708 is plated to an initial thickness between about 0.5–5.0 µm, and preferably to a thickness of about 3.0 µm. Alternatively, the pedestal may be plated prior to the formation of the coils and insulator. Another insulator, such as alumina, hard bake resist, or other suitable insulative material, is then deposited over first pole piece layer 1702 and plated pedestal 1708. Next, CMP is performed on a top surface of the structure to remove top insulator materials and to expose a top of plated pedestal 1708 such that the top surfaces of both insulator 1706 and plated pedestal 1708 are coplanar. Plated pedestal 1708 is thereby formed into the bottom pedestal portion of the bilayer pole tip. The resulting structure is shown in FIG. 17A. Alternatively, a resulting structure similar to that shown and described in relation to FIG. 14B may be formed.

Figure 17B:
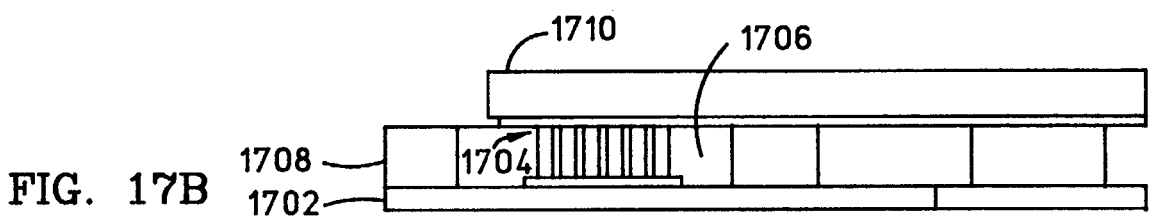
Figure 17C:
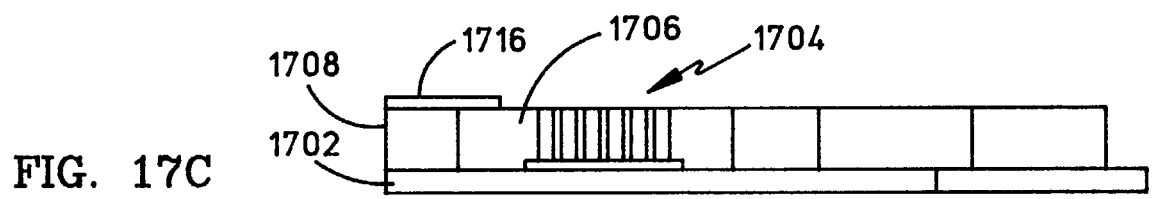

In FIG. 17B, a photoresist mask 1710 is then formed slightly behind the ABS to mask the entire structure except for the top of plated pedestal 1708 and a front top portion of insulator 1706, as shown. The exact position of the photoresist mask's edge (an example of which is shown) determines the P1 cap throat height, which is set to provide the desired write head performance considering its impact on the fabrication of the second pole piece. In one embodiment, the photoresist mask's edge is placed closer towards the ABS than the back edge of the pedestal, providing tighter control on the zero throat height of the head. In FIG. 17C, a high $M_S$ material is then sputter deposited with the photoresist mask in place to form a high $M_s$ layer 1716 over plated pedestal 1708 (and optionally over the front top portion of insulator 1706). High $M_s$ layer 1716 is thereby formed into the top pole portion of the bilayer pole tip. Next, the photoresist mask 1710 (shown in FIG. 17B) is removed using a suitable solvent to dissolve its release layer.

Figure 17D:
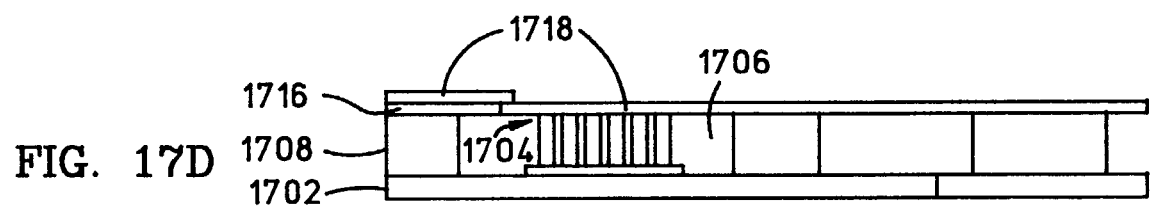

In FIG. 17D, a gap layer 1718 is then deposited over the entire structure, including over high $M_s$ layer 1716 and insulator 1706. This deposition is suitably controlled in time or by an end point detection technique such that a top surface of high $M_s$ layer 1716 becomes substantially flush with a portion of the top surface of gap layer 1718 that resides over write coils 1704. Note that, as shown, gap layer 1718 is elevated higher over high $M_s$ layer 1716 than it is over write coils 1704. Nonetheless, a portion of the top surface of gap layer 1718 that resides over high $M_S$ layer 1716 is substantially planar. The resulting structure is shown in FIG. 17D.

Figure 17E:
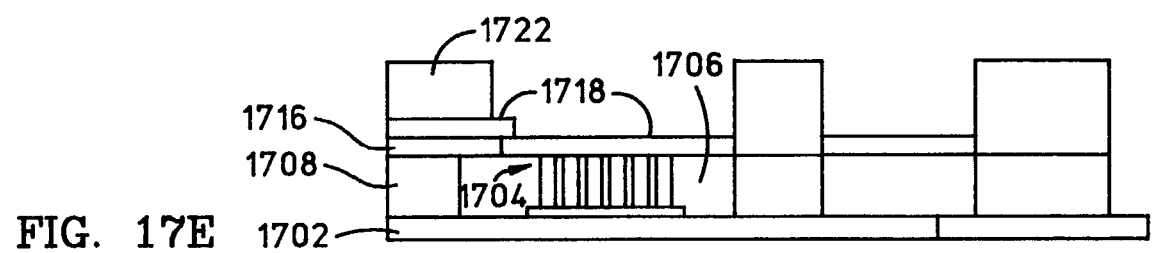

In FIG. 17E, a second pole piece 1722 ("P2") is then formed over that portion of gap layer 1718 that resides above the pole tip and insulator 1706, as shown. P2 formation may be done using well-known techniques, such as electrical frame plating, or image transfer of a P2 pattern by RIE into a hardmask and suitable dielectric material. In one embodiment, second pole piece 1722 is formed on top of a high moment seed layer (not shown) which has a $M_S$ greater than the $M_S$ of second pole piece 1722. Therefore, the highest magnetic moment material (seed layer) is directly adjacent to the write gap. After P2 formation, high $M_s$ layer 1716 is notched using conventional ion milling techniques where the second pole piece 1722 is used as a milling mask. The resulting structure is shown in FIG. 17E, which may have one of the ABS views shown in FIG. 12 or 13A. Plated pedestal 1708 and high $M_s$ layer 1716 form the bilayer pole tip of the first pole piece. Other conventional steps may complete formation of the magnetic head. For example, a second coil layer (and perhaps additional coil layers) is subsequently formed, followed by the formation of a third pole piece ("P3") which is a magnetic flux connecting layer positioned on top of P2 and (optionally) recessed from the ABS.

Figure 18A:
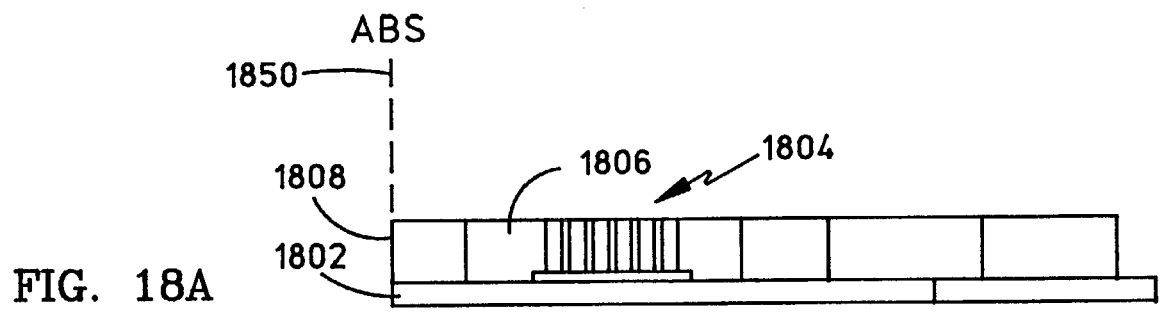
FIGS. 18A–18D are a series of illustrations used to describe another method of making a magnetic head in accordance with the invention.

Yet even another method of making a magnetic write head having a bilayer pole tip is described in relation to FIGS. 18A–18D. Beginning with FIG. 18A, a first pole piece layer 1802 ("P1") is formed over a substrate by frame plating. The substrate may be any underlying component or layer, such as a shield layer (which is covered by an insulator layer) or a second gap layer. Next, write coils 1804 are formed over an insulator on top of first pole piece layer 1802. Write coils 1804 are protected with a surrounding insulator 1806, which may be a hard bake resist, alumina ($Al_2O_3$), or other suitable insulative material. A pedestal 1808 is then frame plated over first pole piece layer 1802 as part of the pole tip after etching away insulator materials in front and in the back gap regions. Preferably, plated pedestal 1808 is plated to a thickness between about 0.5–5.0 µm, and preferably to a thickness of about 3.0 µm. Alternatively, the pedestal may be plated prior to the formation of the coils and insulator. Another insulator (not shown in FIG. 18A), such as alumina, hard bake resist, or other suitable insulative material, is then deposited over first pole piece layer 1802 and plated pedestal 1808. Next, CMP is performed on a top surface of the structure to remove top insulator materials and to expose a top of plated pedestal 1808 such that the top surfaces of both insulator 1806 and plated pedestal 1808 are coplanar. Plated pedestal 1808 is thereby formed into the bottom pedestal portion of the bilayer pole tip. The resulting structure is shown in FIG. 18A. Alternatively, a resulting structure similar to that shown and described in relation to FIG. 14B may be formed.

Figure 18B:
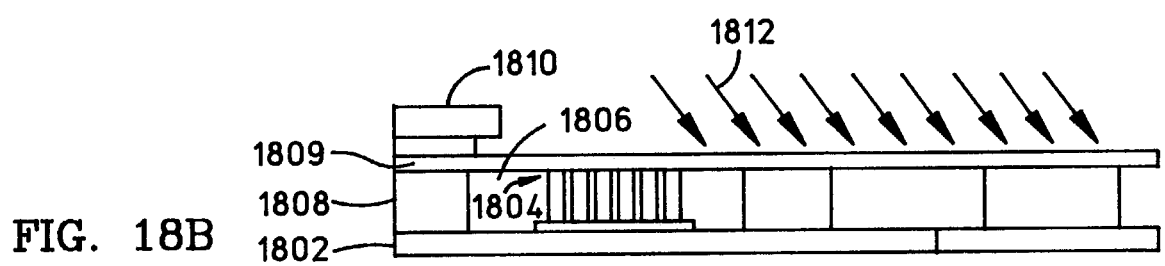

In FIG. 18B, a high $M_S$ material 1809 is then sputter deposited over the entire structure including over plated pedestal 1808, write coils 1804, and insulator 1806. Next, a photoresist mask 1810 is formed to mask that portion of high $M_s$ materials 1809 that reside over plated pedestal 1808 and a front portion of insulator 1806, as shown. The exact position of the photoresist mask's edge (an example of which is shown) determines the P1 cap throat height, which is set to provide the desired write head performance considering its impact on the fabrication of the second pole piece. In one embodiment, the photoresist mask's edge is placed closer towards the ABS than the back edge of the pedestal, providing tighter control on the zero throat height of the head. Next, ion milling is performed as indicated by arrows 1812 to remove the exposed high $M_s$ material and to reach the top of insulator 1806 or the top of write coils 1804. The resulting structure is shown in FIG. 18B. The photoresist mask 1810 is removed using a suitable solvent to dissolve its release layer.

Figure 18C:
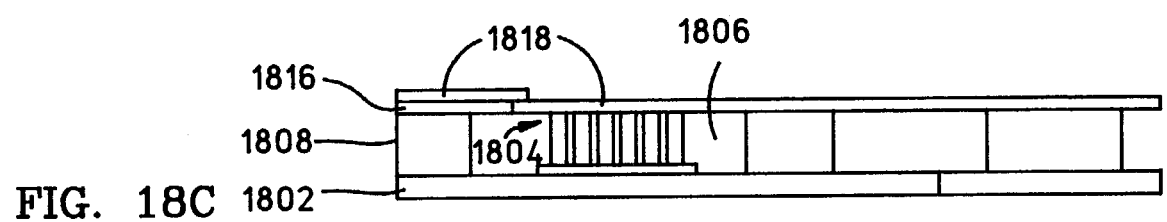

In FIG. 18C, a remaining high $M_s$ layer 1816 which was formed from the ion milling is shown. This layer 1816 is the top pole portion of the bilayer pole tip. A gap layer 1818 is then deposited over the entire structure including over high $M_s$ layer 1816 and insulator 1806 (and/or write coils 1804). This deposition is suitably controlled in time or by an end point detection technique such that a top surface of high $M_s$ layer 1816 becomes substantially flush with a portion of the top surface of gap layer 1818 that resides over write coils 1804. Note that, as shown, gap layer 1818 is elevated higher over high $M_s$ layer 1816 than it is over write coils 1804.

Nonetheless, a portion of the top surface of gap layer 1818 that resides over high $M_S$ layer 1816 is substantially planar. The resulting structure is shown in FIG. 18C.

Figure 18D:
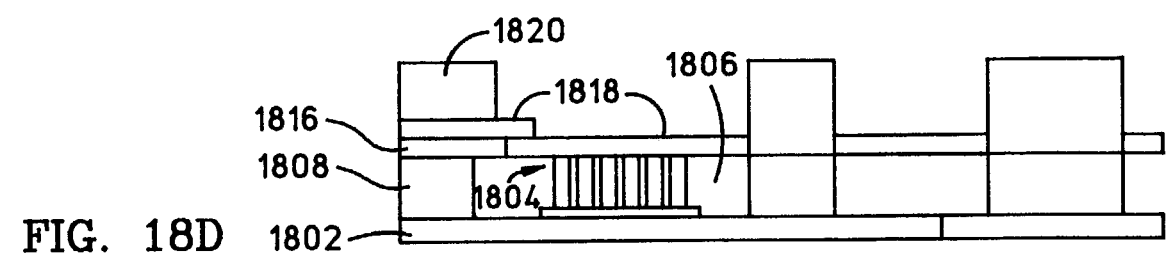

In FIG. 18D, a second pole piece 1820 ("P2") is then formed over that portion of gap layer 1818 that resides above the pole tip and insulator 1806, as shown. P2 formation may be done using well-known techniques, such as electrical frame plating, or image transfer of a P2 pattern by RIE into a hardmask and suitable dielectric material. In one embodiment, second pole piece 1820 is formed on top of a high moment seed layer (not shown) which has a $M_S$ greater than the $M_S$ of second pole piece 1820. Therefore, the highest magnetic moment material (seed layer) is directly adjacent to the write gap. After P2 formation, high $M_s$ layer 1816 is notched using conventional ion milling techniques where the second pole piece 1820 is used as a milling mask. The resulting structure is shown in FIG. 18D, which may have one of the ABS views shown in FIG. 12 or 13A. Plated pedestal 1808 and high $M_s$ layer 1816 form the bilayer pole tip of the first pole piece. Other conventional steps may complete formation of the magnetic head. For example, a second coil layer (and perhaps additional coil layers) is subsequently formed, followed by the formation of a third pole piece ("P3") which is a magnetic flux connecting layer positioned on top of P2 and (optionally) recessed from the ABS.

Figure 19A:
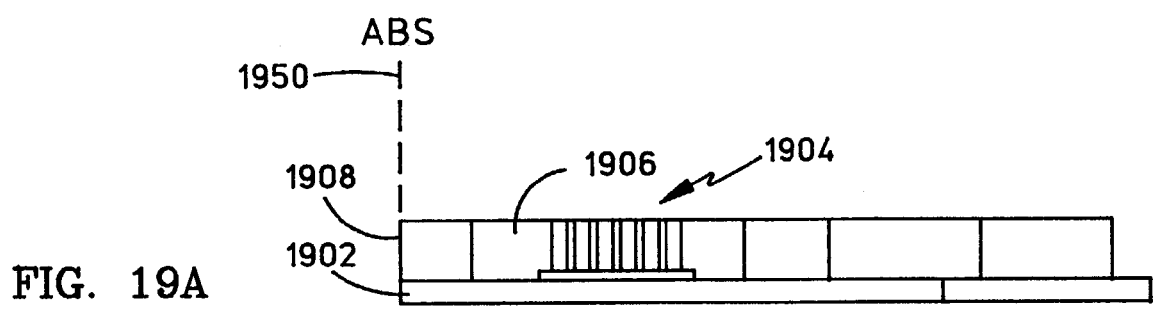
FIGS. 19A–19D are a series of illustrations used to describe yet another method of making a magnetic head in accordance with the invention.

Another method of making a magnetic write head having a bilayer pole tip is described in relation to FIGS. 19A–19D. Beginning with FIG. 19A, a first pole piece layer 1902 ("P1") is formed over a substrate by frame plating. The substrate may be any underlying component or layer, such as a shield layer (which is covered by an insulator layer) or a second gap layer. Next, write coils 1904 are formed over an insulator on top of first pole piece layer 1902. Write coils 1904 are protected with a surrounding insulator 1906, which may be a hard bake resist, alumina ($Al_2O_3$), or other suitable insulative material. A pedestal 1908 is then frame plated over first pole piece layer 1902 as part of the pole tip after etching away insulator materials in front and in the back gap regions. Preferably, plated pedestal 1908 is plated to a thickness between about 0.5–5.0 µm, and preferably to a thickness of about 3.0 µm. Alternatively, the pedestal may be plated prior to the formation of the coils and insulator. Another insulator (not shown in FIG. 19A), such as alumina, hard bake resist, or other suitable insulative material, is then deposited over first pole piece layer 1902 and plated pedestal 1908. Next, CMP is performed on a top surface of the structure to remove top insulator materials and to expose a top of plated pedestal 1908 such that the top surfaces of both insulator 1906 and plated pedestal 1908 are coplanar. Plated pedestal 1908 is thereby formed into the bottom pedestal portion of the bilayer pole tip. The resulting structure is shown in FIG. 19A. Alternatively, a resulting structure similar to that shown and described in relation to FIG. 14B may be formed.

Figure 19B:
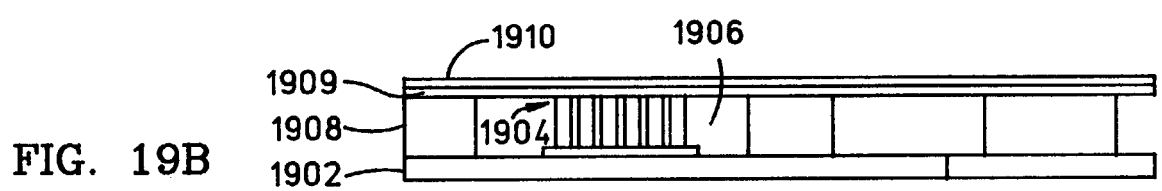
Figure 19C:
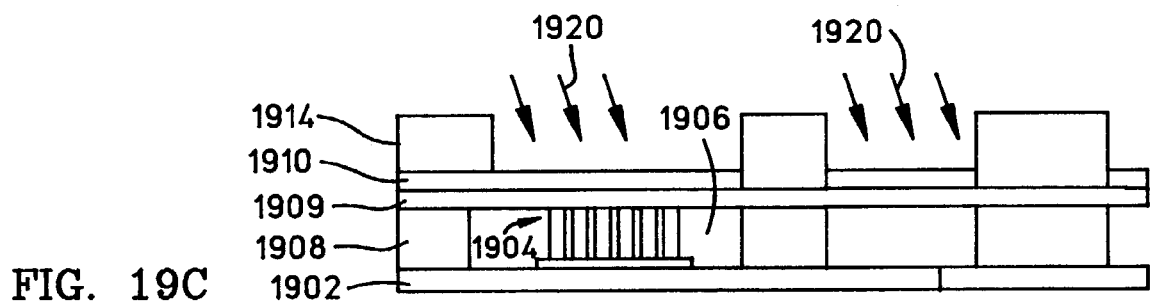
Figure 19D:
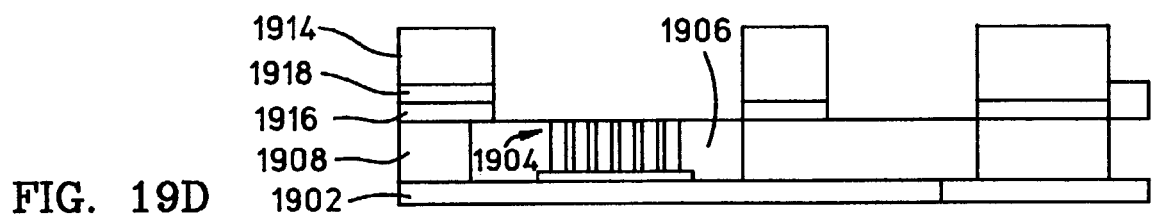

In FIG. 19B, a high $M_S$ material 1909 is then sputter deposited over the entire structure including over plated pedestal 1908, write coils 1904, and insulator 1906. Next, a gap layer 1910 is deposited over the entire high $M_s$ materials 1909. Note that these structures have substantially planar top surfaces. In FIG. 19C, a second pole piece 1914 ("P2") is then formed over that portion of gap layer 1909 that resides above the pole tip and a front portion of insulator 1906, as shown. P2 formation may be done using well-known techniques, such as electrical frame plating, or image transfer of a P2 pattern by RIE into a hardmask and suitable dielectric material. In one embodiment, second pole piece 1914 is formed on top of a high moment seed layer (not shown) which has a $M_S$ greater than the $M_S$ of second pole piece 1914. Therefore, the highest magnetic moment material (seed layer) is directly adjacent to the write gap. After formation of P2, ion milling is performed as indicated by arrows 1920 to remove materials between P2 and the back gap, including portions of gap layer 1910 and high $M_s$ materials 1909 above write coils 1904. The ion milling is also performed to define the pole tip dimensions and notches. The resulting structure is shown in FIG. 19D, which may have one of the ABS views shown in FIG. 12 or 13A. High $M_s$ layer 1916 is thereby formed into the top pole portion of the bilayer pole tip. Plated pedestal 1908 and high $M_s$ layer 1916 form the bilayer pole tip of the first pole piece. Other conventional steps may complete formation of the magnetic head. For example, a second coil layer (and perhaps additional coil layers) is subsequently formed, followed by the formation of a third pole piece ("P3") which is a magnetic flux connecting layer positioned on top of P2 and (optionally) recessed from the ABS.

One last method of making a magnetic write head having a bilayer pole tip is described in relation to FIGS. 20A–20D. Beginning with FIG. 20A, a first pole piece layer 2002 ("P1") is formed over a substrate by frame plating. The substrate may be any underlying component or layer, such as a shield layer (which is covered by an insulator layer) or a second gap layer. Next, write coils 2004 are formed over an insulator on top of first pole piece layer 2002. Write coils 2004 are protected with a surrounding insulator 2006, which may be a hard bake resist, alumina ($Al_2O_3$), or other suitable insulative material. A pedestal 2008 is then frame plated over first pole piece layer 2002 as part of the pole tip after etching away insulator materials in front and in the back gap regions. Preferably, plated pedestal 2008 is plated to a thickness between about 0.5–5.0 µm, and preferably to a thickness of about 3.0 µm. Alternatively, the pedestal may be plated prior to the formation of the coils and insulator. Another insulator (not shown in FIG. 20A), such as alumina, hard bake resist, or other suitable insulative material, is then deposited over first pole piece layer 2002 and plated pedestal 2008. Next, CMP is performed on a top surface of the structure to remove top insulator materials and to expose a top of plated pedestal 2008 such that the top surfaces of both insulator 2006 and plated pedestal 2008 are coplanar. Plated pedestal 2008 is thereby formed into the bottom pedestal portion of the bilayer pole tip. Alternatively, a resulting structure similar to that shown and described in relation to FIG. 14B may be formed.

A high $M_S$ material 2010 is then sputter deposited over the entire structure including on plated pedestal 2008 and insulator 2006 (optionally on write coils 2004 depending on whether they are embedded). Next, stop layer materials 2012 are deposited over high $M_s$ materials 2010. Stop layer materials 2012 may be any suitable material that is non-magnetic and has a relatively low CMP removal rate, as compared to, for example, Permalloy or insulators such as alumina or hard bake resist. Preferably, stop layer materials 2012 may be made of carbon (C), tantalum (Ta), tantalum-oxide ($TaO_x$), or silicon-dioxide ($SiO_2$). Also preferably, stop layer materials 2012 are deposited to a thickness of between about 50 and 1000 Angstroms. Next, a photoresist mask 2014 is formed to mask those portions of stop layer materials 2012 and high $M_s$ materials 2010 that reside over plated pedestal 2008 and a front portion of insulator 2006, as shown. The exact position of the photoresist mask's edge (an example of which is shown) determines the P1 cap throat height, which is set to provide the desired write head performance considering its impact on the fabrication of the second pole piece. In the one embodiment, the photoresist mask's edge is placed closer towards the ABS than the back edge of the pedestal, providing tighter control on the zero throat height of the head. In this embodiment, photoresist mask 2014 is a single photoresist layer. The resulting structure is shown in FIG. 20A.

Figure 20A:
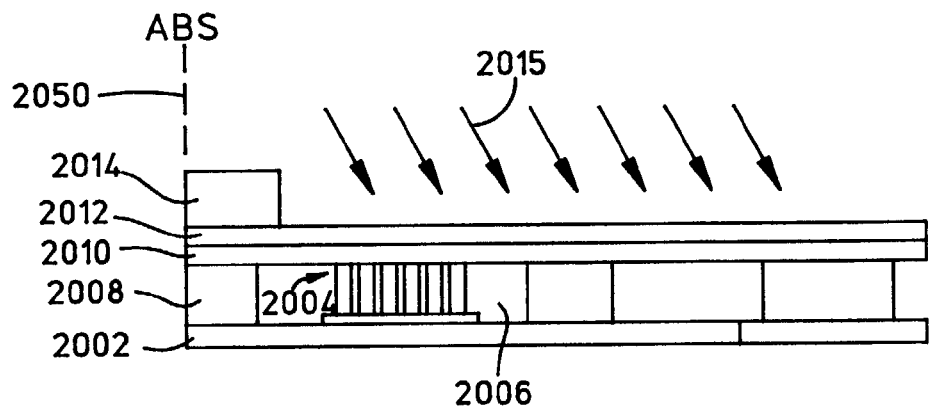
FIGS. 20A–20D are a series of illustrations used to describe another method of making a magnetic head in accordance with the invention.

Continuing with FIG. 20A, a reactive ion etch (RIE) or ion milling is performed as indicated by arrows 2015 to remove that portion of stop layer materials 2012 exposed by the photoresist mask. More particularly, RIE is performed if stop layer materials 2012 are made of e.g. carbon, and ion milling is performed if stop layer materials 2012 are made of e.g. Ta, TaO$_x$, or SiO$_2$. This is done until a top surface of high M$_s$ materials 2010 is exposed. The RIE may be performed using any suitable etch gas, such as one containing fluorine (e.g., CHF$_3$, C$_3$F$_8$, or CF$_4$) or carbon-dioxide (CO$_2$). Subsequently, the exposed high M$_s$ materials 2010 are removed in that region by ion milling also as indicated by arrows 2015. This is done until a top surface of insulator 2006 (and/or write coils 2004) is exposed.

Figure 20B:
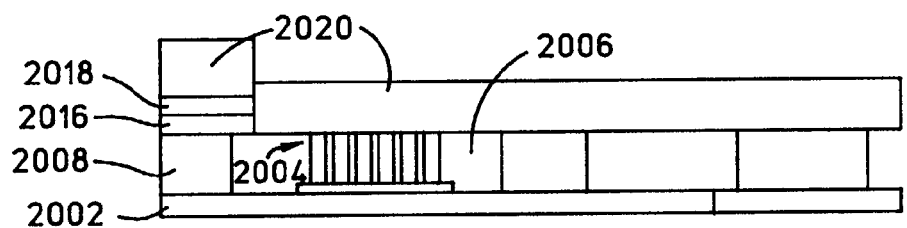

In FIG. 20B, a resulting stop layer 2018 and a resulting high MS layer 2016 remain underneath photoresist mask 2014. Photoresist mask 2014 is then removed. The remaining stop layer 2018 may then be partially or wholly removed by RIE if desired. Next, an insulator layer 2020 is deposited over the entire surface. Insulator layer 2020, which may be alumina (Al$_2$O$_3$), is deposited until a top surface portion that resides over write coils 2004 is greater than or equal to the height of stop layer 2018 (if it exists) or high M$_S$ layer 2016. This deposition is suitably controlled in time or by an end point detection technique to reach the appropriate thickness. The resulting structure is shown in FIG. 20B.

Figure 20C:
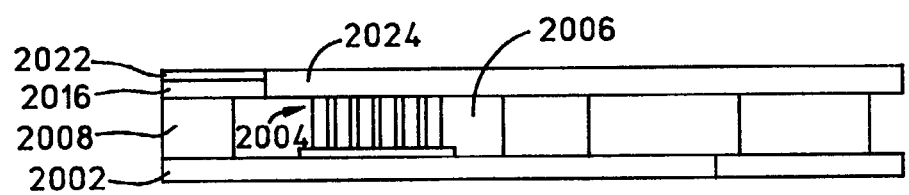

In FIG. 20C, a CMP process is utilized over the entire structure to remove much of the top portion of insulator layer 2020. This process is continued until the top surface of stop layer 2022 is reached (if it exists), or until a top portion of stop layer 2022 is removed (if it exists), or until stop layer 2022 is completely removed (if it exists) and a top surface of high M$_S$ layer 2016 is reached, or until a top surface of high M$_S$ layer 2016 is reached. The top surface of this entire structure is thereby made coplanar. If any portion of stop layer 2022 remains, it effectively becomes part of the gap layer and its thickness.

Figure 20D:
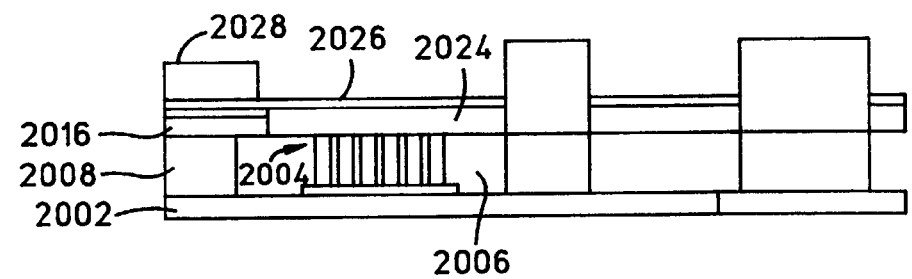

In FIG. 20D, a gap layer 2026 is deposited over the entire high M$_s$ materials 1909. Next, a second pole piece 2028 ("P2") is then formed over that portion of gap layer 2026 that resides above the pole tip and a front portion of insulator 2006, as shown. P2 formation may be done using well-known techniques, such as electrical frame plating, or image transfer of a P2 pattern by RIE into a hardmask and suitable dielectric material. In one embodiment, second pole piece 2028 is formed on top of a high moment seed layer (not shown) which has a M$_S$ greater than the M$_S$ of second pole piece 2028. Therefore, the highest magnetic moment material (seed layer) is directly adjacent to the write gap. The resulting structure after P2 formation is shown in FIG. 20D, which may have one of the ABS views shown in FIG. 12 or 13A. Plated pedestal 2008 and high M$_s$ layer 1916 form the bilayer pole tip of the first pole piece. Other conventional steps may complete formation of the magnetic head. For example, a second coil layer (and perhaps additional coil layers) is subsequently formed, followed by the formation of a third pole piece ("P3") which is a magnetic flux connecting layer positioned on top of P2 and (optionally) recessed from the ABS.

Note again that, when making a magnetic head in accordance with any of the above-described methods, the position of the photoresist mask's edge determines the P1 cap throat height. The value of the throat height is predetermined to provide the desired write head performance considering its impact on the fabrication of the second pole piece. At the interface between the top pole portion (P1 cap) and the insulating alumina, there may be some small amount of topography. If the throat height of the top pole portion (P1 cap) is chosen such that this interface falls under second pole piece, then the fabrication of the structure of the second pole piece may be impacted by that topography. If the fabrication of the second pole piece utilizes an image transfer technique, then this topography will have negligible impact on processing of the second pole piece.

Thus, a magnetic head having improved writing capabilities, such as an improved overwrite (OW) capability and reduced fringing fields, has been described. Such a magnetic head includes a first pole piece; a second pole piece; and a gap layer in between the first and the second pole pieces. The first pole piece has a first pole piece layer, a pedestal portion is formed over the first pole piece layer, and a notched top pole portion formed over the pedestal portion. The pedestal portion has a first saturation magnetization M$_{S1}$ and the top pole portion has a second saturation magnetization M$_{S2}$ that is greater than the first saturation magnetization M$_{S1}$. For example, M$_{S2}$ may be at least 5% greater than M$_{S1}$. In addition, the top pole portion has a substantially planar top surface on which a portion of the gap layer and the second pole piece are formed. Methods of making such magnetic heads have also been described. Each method includes the acts of forming a first pole piece layer on a substrate; forming a pedestal portion having a first saturation magnetization M$_{S1}$ over the first pole piece layer; and forming a top pole portion having a second saturation magnetization M$_{S2}$ that is greater than the first saturation magnetization M$_{S1}$ over the pedestal portion. The top pole portion is formed to have a substantially planar top surface over which a gap layer and second pole piece are positioned.

It is to be understood that the above is merely a description of preferred embodiments of the invention and that various changes, alterations, and variations may be made without departing from the true spirit and scope of the invention as set for in the appended claims. Although the photoresist mask mostly described is a bi-layer lift off mask which includes a top photoresist layer and a bottom release layer, any suitable photoresist mask will be adequate such as a single layer photoresist mask. None of the terms or phrases in the specification and claims has been given any special particular meaning different from the plain language meaning to those skilled in the art, and therefore the specification is not to be used to define terms in an unduly narrow sense.

What is claimed is:

1. A magnetic head, comprising:
    a first pole piece;
    a second pole piece;
    a gap layer which separates the first and the second pole pieces;
    the first pole piece having:
        a first pole piece layer;
        a pedestal portion formed on top of the first pole piece layer;
        the pedestal portion having a first saturation magnetization M$_{S1}$;
        a top pole portion formed on top of a top surface of the pedestal portion;

the top pole portion having a rear edge extending behind a rear edge of the pedestal portion;

the top pole portion having a second saturation magnetization $M_{S2}$;

the second saturation magnetization $M_{S2}$ being greater than the first saturation magnetization $M_{S1}$;

write coils;

an insulator material surrounding the write coils;

a top surface of the insulator material being substantially flush with the top surface of the pedestal portion;

the top pole portion of the first pole piece being formed over the top surface of the pedestal portion and a first top surface portion of the insulator material;

the gap layer being formed over the top surface of the top pole portion; and a top surface of the gap layer being substantially planar over the top pole tip pedestal portion.

2. The magnetic head of claim 1, wherein the second saturation magnetization $M_{S2}$ is at least 5% greater than the first saturation magnetization $M_{S1}$.

3. The magnetic head of claim 1, wherein the gap layer comprises a chemical mechanical polishing (CMP) stop layer.

4. The magnetic head of claim 1, further comprising:
the top pole portion having the rear edge extending behind the rear edge of the pedestal portion for reduced fringing fields from the magnetic head.

5. The magnetic head of claim 1, wherein the gap layer comprises a chemical mechanical polishing (CMP) stop layer made of one of carbon, tantalum, tantalum-oxide, and silicon-dioxide.

6. A magnetic recording device, comprising:
at least one rotatable magnetic disk;
a spindle supporting the at least one rotatable magnetic disk;
a disk drive motor for rotating the at least one rotatable magnetic disk;
a magnetic head for writing data to the at least one rotatable magnetic disk;
a slider for supporting the magnetic head;
the magnetic head including:
a first pole piece;
a second pole piece;
a gap layer which separates the first and the second pole pieces;
the first pole piece having:
a first pole piece layer;
a pedestal portion formed on top of the first pole piece layer;
the pedestal portion having a first saturation magnetization $M_{S1}$;
a top pole portion formed on top of a top surface of the pedestal portion;
the top pole portion having a rear edge extending behind a rear edge of the pedestal portion;
the top pole portion having a second saturation magnetization $M_{S2}$;
the second saturation magnetization $M_{S2}$ being greater than the first saturation magnetization $M_{S1}$;
write coils;
an insulator material surrounding the write coils;
a top surface of the insulator material being substantially flush with the top surface of the pedestal portion;
the top pole portion of the first pole piece being formed over the top surface of the pedestal portion and a first top surface portion of the insulator material;
the gap layer being formed over the top surface of the top pole portion; and
a top surface of the gap layer being substantially planar over the top pole tip pedestal portion.

7. The magnetic recording device of claim 6, wherein the second saturation magnetization $M_{S2}$ is at least 5% greater than the first saturation magnetization $M_{S1}$.

8. The magnetic recording device of claim 6, wherein the gap layer comprises a chemical mechanical polishing (CMP) stop layer.

9. The magnetic recording device of claim 6, further comprising:
the top pole portion having the rear edge extending behind the rear edge of the pedestal portion for reduced fringing fields from the magnetic head.

10. The magnetic recording device of claim 6, wherein the gap layer comprises a chemical mechanical polishing (CMP) stop layer made of one of carbon, tantalum, tantalum-oxide, and silicon-dioxide.

11. A magnetic head, comprising:
a first pole piece;
a second pole piece;
a gap layer which separates the first and the second pole pieces;
the gap layer comprising a chemical mechanical polishing (CMP) stop layer;
the first pole piece having:
a first pole piece layer;
a pedestal portion formed on top of the first pole piece layer;
the pedestal portion having a first saturation magnetization $M_{S1}$;
a top pole portion formed on top of a top surface of the pedestal portion;
the top pole portion having a rear edge extending behind a rear edge of the pedestal portion;
the top pole portion having a second saturation magnetization $M_{S2}$;
the second saturation magnetization $M_{S2}$ being greater than the first saturation magnetization $M_{S1}$;
write coils;
an insulator material surrounding the write coils;
a top surface of the insulator material being substantially flush with the top surface of the pedestal portion;
the top pole portion of the first pole piece being formed over the top surface of the pedestal portion and a first top surface portion of the insulator material;
the gap layer being formed over the top surface of the top pole portion; and
a top surface of the gap layer being substantially planar over the top pole tip pedestal portion.

12. The magnetic head of claim 11, wherein the second saturation magnetization $M_{S2}$ is at least 5% greater than the first saturation magnetization $M_{S1}$.

13. The magnetic head of claim 11, wherein the gap layer comprises the CMP stop layer which is made of one of carbon, tantalum, tantalum-oxide, and silicon-dioxide.

14. A magnetic recording device, comprising:
at least one rotatable magnetic disk;
a spindle supporting the at least one rotatable magnetic disk;
a disk drive motor for rotating the at least one rotatable magnetic disk;

a magnetic head for writing data to the at least one rotatable magnetic disk;
a slider for supporting the magnetic head;
the magnetic head including:
  a first pole piece;
  a second pole piece;
  a gap layer which separates the first and the second pole pieces;
  the gap layer comprising a chemical mechanical polishing (CMP) stop layer;
  the first pole piece having:
    a first pole piece layer;
    a pedestal portion formed on top of the first pole piece layer;
    the pedestal portion having a first saturation magnetization $M_{S1}$;
    a top pole portion formed on top of a top surface of the pedestal portion;
    the top pole portion having a rear edge extending behind a rear edge of the pedestal portion;
    the top pole portion having a second saturation magnetization $M_{S2}$;
    the second saturation magnetization $M_{S2}$ being greater than the first saturation magnetization $M_{S1}$;
  write coils;
  an insulator material surrounding the write coils:
  a top surface of the insulator material being substantially flush with the top surface of the pedestal portion;
  the top pole portion of the first pole piece being formed over the top surface of the pedestal portion and a first top surface portion of the insulator material;
  the gap layer being formed over the top surface of the top pole portion; and
  a top surface of the gap layer being substantially planar over the top pole tip pedestal portion.

15. The magnetic recording device of claim 14, wherein the second saturation magnetization $M_{S2}$ is at least 5% greater than the first saturation magnetization $M_{S1}$.

16. The magnetic recording device of claim 14, wherein the gap layer comprising the CMP stop layer is made of one of carbon, tantalum, tantalum-oxide, and silicon-dioxide.

* * * * *